United States Patent
Arur et al.

(10) Patent No.: US 11,032,751 B2
(45) Date of Patent: Jun. 8, 2021

(54) USER TERMINAL HANDOVER PREDICTION IN WIRELESS COMMUNICATIONS SYSTEMS WITH NONSTATIONARY COMMUNICATIONS PLATFORMS

(71) Applicant: Hughes Network Systems, LLC, Germantown, MD (US)

(72) Inventors: Deepak Arur, McLean, VA (US); Channasandra Ravishankar, Clarksburg, MD (US); Nassir Benammar, Rockville, MD (US); Charles Barnett, Ashburn, VA (US); John Corrigan, Chevy Chase, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 17 days.

(21) Appl. No.: 16/253,081

(22) Filed: Jan. 21, 2019

(65) Prior Publication Data
US 2019/0230568 A1    Jul. 25, 2019

Related U.S. Application Data

(60) Provisional application No. 62/619,443, filed on Jan. 19, 2018.

(51) Int. Cl.
*H04W 36/30*    (2009.01)
*H04B 7/195*    (2006.01)
*H04B 7/185*    (2006.01)

(52) U.S. Cl.
CPC ........ *H04W 36/30* (2013.01); *H04B 7/18541* (2013.01); *H04B 7/195* (2013.01)

(58) Field of Classification Search
CPC .... H04W 36/30; H04B 7/18541; H04B 7/195
See application file for complete search history.

(56) References Cited

U.S. PATENT DOCUMENTS 5,574,968 A    11/1996   Olds et al.
5,956,644 A *  9/1999    Miller ................ H04B 7/18567
                                                                455/12.1

(Continued)

FOREIGN PATENT DOCUMENTS

EP    0637142 A1    2/1995
EP    0920143 A1    6/1999
EP    1764933 A1    3/2007

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall lescription; Stage 2", 3GPP TS 36.300, V14.1.0, Dec. 2016.

(Continued)

*Primary Examiner* — Luat Phung
(74) *Attorney, Agent, or Firm* — Potomac Technology Law, LLC

(57) ABSTRACT

A method for prediction of UT handovers in a satellite communications network is provided. Optimal characteristics regarding the beams of satellites and regarding a one UT are determined. For each of a plurality of the satellite beams, for each of a plurality of instants of time $t_n$, an estimated signal strength as seen at the UT is determined, wherein each estimated signal strength is determined based on the optimal at the respective time $t_n$. A next instant of time $t_m$ is determined at which the estimated signal strength for a candidate beam that is within the view of the UT is greater than or equal to the estimated signal strength for the satellite beam that is currently servicing the UT. A handover of the UT, at the time $t_m$, from the satellite beam that is currently servicing the one UT to the candidate beam is determined.

18 Claims, 13 Drawing Sheets

(56) References Cited

U.S. PATENT DOCUMENTS

| | | |
|---|---|---|
| 6,104,911 A | 8/2000 | Diekelman |
| 6,108,538 A * | 8/2000 | Blasiak ............... H04B 7/18541 370/316 |
| 6,122,507 A | 9/2000 | Gerard et al. |
| 6,240,124 B1 | 5/2001 | Wiedeman et al. |
| 6,246,874 B1 | 6/2001 | Voce |
| 6,609,002 B1 | 8/2003 | Krishnamurthy et al. |
| 8,326,217 B2 | 12/2012 | Wahlberg et al. |
| 8,743,722 B2 | 6/2014 | Miura |
| 9,681,337 B2 | 6/2017 | Davis et al. |
| 9,742,484 B2 | 8/2017 | Jalali |
| 9,749,928 B2 | 8/2017 | Benammar et al. |
| 9,826,454 B2 | 11/2017 | Cili et al. |
| 2002/0132579 A1* | 9/2002 | Hart .................... H04B 7/1855 455/12.1 |
| 2005/0053026 A1 | 3/2005 | Mullan et al. |
| 2005/0227631 A1 | 10/2005 | Robinett |
| 2006/0007863 A1 | 1/2006 | Naghian |
| 2008/0232258 A1 | 9/2008 | Larsson et al. |
| 2009/0092074 A1 | 4/2009 | Jamalipour et al. |
| 2010/0238853 A1 | 9/2010 | Zhou et al. |
| 2010/0246480 A1 | 9/2010 | Aggarwal et al. |
| 2010/0278141 A1 | 11/2010 | Choi-Grogan et al. |
| 2012/0028627 A1 | 2/2012 | Hunzinger |
| 2012/0131618 A1 | 5/2012 | Leater et al. |
| 2012/0133554 A1 | 5/2012 | Bromley et al. |
| 2013/0102309 A1 | 4/2013 | Chande et al. |
| 2013/0156008 A1 | 6/2013 | Dinan et al. |
| 2013/0225172 A1 | 8/2013 | Singh et al. |
| 2014/0150034 A1 | 5/2014 | Frisco et al. |
| 2014/0314000 A1 | 10/2014 | Liu et al. |
| 2015/0063203 A1 | 3/2015 | Kim et al. |
| 2015/0109943 A1 | 4/2015 | Sarin et al. |
| 2015/0126193 A1 | 5/2015 | Huang et al. |
| 2015/0236781 A1 | 8/2015 | Jalali |
| 2015/0271730 A1 | 9/2015 | Benammar et al. |
| 2016/0233947 A1 | 8/2016 | Shen et al. |
| 2016/0360533 A1 | 12/2016 | Bennett et al. |
| 2017/0064583 A1 | 3/2017 | Roy et al. |
| 2017/0105153 A1* | 4/2017 | Ashrafi ............... H04W 36/245 |
| 2017/0238216 A1* | 8/2017 | Damnjanovic ....... H04W 16/28 455/427 |
| 2017/0332303 A1 | 11/2017 | Sunay et al. |
| 2017/0367019 A1* | 12/2017 | Schultz .............. H04B 7/18508 |
| 2019/0044611 A1* | 2/2019 | Treesh ................ H04W 36/24 |

OTHER PUBLICATIONS

EPO, "Extended European Search Report & Written Opinion", EP15805999.8, dated Oct. 26, 2017.

US Patent Office, "PCT Search Report & Written Opinion", Application No. PCT/US2015/021377, dated Dec. 7, 2015.

USPTO, "International Search Report and Written Opinion", PCT/US2019/014421, dated Apr. 24, 2019.

* cited by examiner

USER TERMINAL HANDOVER PREDICTION IN WIRELESS COMMUNICATIONS SYSTEMS WITH NONSTATIONARY COMMUNICATIONS PLATFORMS

RELATED APPLICATIONS

This application claims the benefit of the earlier filing date under 35 U.S.C. § 119(e) from U.S. Provisional Application Ser. No. 62/619,443 (filed 2018 Jan. 19), the entirety of which is incorporated by reference herein.

BACKGROUND

The Third Generation Partnership Project (3GPP) technical specification 3GPP TS 36.300, "Evolved Universal Terrestrial Radio Access (E-UTRA) and Evolved Universal Terrestrial Radio Access Network (E-UTRAN)," provides an overview and overall description of the E-UTRAN radio interface protocol architecture. According to the overall architecture, the E-UTRAN consists of E-UTRAN NodeB's (eNBs), providing the E-UTRA user plane (Packet Data Convergence Protocol (PDCP), Radio Link Control (RLC), Medium Access Control (MAC) and Physical Layer (PHY)) and control plane Radio Resource Control (RRC) protocol terminations towards the user terminal or user equipment (UE). The eNBs are interconnected with each other by means of the X2 interface. The eNBs are also connected by means of the S1 interface to the Evolved Packet Core (EPC), more specifically to the Mobility Management Entity (MME) by means of the S1-MME interface and to the Serving Gateway (SGW) by means of the S1-U interface. The S1 interface supports a many-to-many relation between MME/SGWs and eNBs. With regard to mobility management and handover of a UE, the 3GPP TS 36.300 document describes a procedure known as "UE-assisted network controlled handover," which is based on (i) the network providing the UE with measurement configuration, (ii) the UE detecting neighboring cells, performing measurements and reporting back to the network, and (iii) the network using the measurements to make a handover decision. The handover decision under this procedure is executed immediately.

U.S. Pat. No. 9,749,928, "Apparatus and Method for Efficient Handover for Low Earth Orbit (LEO) Satellite Systems," provides approaches for efficient, dynamic and continuous handover processes, which encompass selection of an optimal path (consisting of a satellite, a satellite beam and carrier frequency set) over which a mobile UE or user terminal (UT) communicates with the radio access network in a mobile satellite communications system. According to example embodiments described therein, an approach for making handover decisions may be based on UE-reported measurements and a priori information regarding beam gains, frequencies, path loss, etc., to calculate adjusted estimates of candidate beam signal strengths and compare these estimates and measurements to make the handover decision. Similar to the handover procedure of the 3GPP TS 36.300, the handover decisions of the approaches from the U.S. Pat. No. 9,749,928 patent are also promptly executed.

Such current handover techniques, however, are not predictive, and thus the handover determination and handover process are performed in real time and accordingly result in inefficient capacity utilization and disruption to the UE operation.

What is needed, therefore, are approaches for efficient and accurate prediction of handovers of user terminals between radio beams in non-stationary wireless communications systems (e.g., non-geosynchronous orbit (NGSO) satellite communications systems, such as low earth orbit (LEO) or medium earth orbit (MEO) satellite communications systems).

Some Example Embodiments

Embodiments of the present invention advantageously address the foregoing requirements and needs, as well as others, by providing approaches for efficient and accurate prediction of handovers of user terminals between radio beams in non-stationary wireless communications systems (e.g., non-geosynchronous orbit (NGSO) satellite communications systems, such as low earth orbit (LEO) or medium earth orbit (MEO) satellite communications systems), which achieve improved system capacity utilization and improved user experience (e.g., shorter interruptions, higher average signal quality & data rates).

According to example embodiments of the present invention novel approaches for accurately predicting upcoming handovers of user terminals (UTs) or user equipment (UEs) between radio beams in a communication system having fast-moving radio beams, such as NGSO satellite constellations and airborne communications platforms, are provided. Further, such approaches are applicable to stationary and moving user terminals. The provided approaches may be selectively invoked in isolation or in combination in a system in an adaptive fashion depending on factors such as the magnitude and type of uncertainty in the knowledge of satellite gain patterns, satellite attitude and UT position.

Such example embodiments include various novel aspects that provide significant advantages and achieve considerable advancements over the prior art, including:

Using signal strength measurements, estimates, or a combination thereof to predict the times and targets (target beam/cell) or future handovers.

"Ideal Prediction": Using the knowledge of time-varying system conditions to predict future handovers without needing measurements.

Attitude Error Estimation: Using signal strength observations to estimate the error in spacecraft attitude control.

Beam Gain Pattern Estimation: Using signal strength observations to estimate the beam gain pattern (multiple approaches).

Using attitude errors and beam gain patterns determined by these methods to continuously correct the models used by the "Ideal Prediction" method.

"Pure Measurement-Based Prediction": Using multiple successive measurements from a UT of serving and candidate beams to predict a future handover point.

Hybrid of "Ideal" and "Measurement-Based" prediction: Using fewer (even a single) measurements from a UT of serving and candidate beams to predict a future handover point by using knowledge of system conditions.

Adaptive techniques: Using multiple handover prediction techniques, dynamically changing the methods used according to observed conditions so as to reduce the overhead of prediction.

In accordance with example embodiments, a method is provided for prediction of user terminal handovers in a satellite data communications network that includes a plurality of satellites and a plurality of user terminals (UTs), wherein each satellite services a plurality of cells via a plurality of respective satellite beams at any given instant of time. The method comprises determining a plurality of respective optimal characteristics regarding the satellite beams of each of one or more of the satellites and regarding a one of the UTs. The method further comprises determining a time increment δt and a number of intervals N over which the prediction is to be performed. The method further comprises determining, for each of a plurality of the satellite beams of one or more of the satellites that is within the view of an antenna of the one UT, for each of a plurality of instants of time $t_n$, where $t_n=t_0+n\delta t$, for $n\in[0, 1, \ldots, N-1]$, an estimated signal strength as seen at the one UT, wherein each estimated signal strength is determined based on one or more of the optimal characteristics relative to the respective time $t_n$ for which the estimated signal strength is being determined. The method further comprises determining a next instant of time $t_m$ at which the estimated signal strength of a one candidate beam of the plurality of the satellite beams of the one or more of the satellites that is within the view of an antenna of the one UT is greater than or equal to the estimated signal strength of a one of the plurality of the satellite beams of the one or more of the satellites that is currently servicing the one UT. The method further comprises determining to handover the one UT, at the time $t_m$, from the satellite beam that is currently servicing the one UT to the candidate beam. By way of example, the respective optimal characteristics regarding the satellite beams of each of one or more of the satellites and regarding the one UT comprise a position $p_{s,i}$ and pitch, roll and yaw attitudes $p_i$, $r_i$, $y_i$ for each of the one or more of the satellites, a position $p_u$ of the one UT, an elevation $\theta_{i,j}$ and an azimuth $\varphi_{i,j}$ of the one UT for each satellite beam j for each satellite i of the one or more of the satellites, with respect to reference directions of an antenna of the satellite, and a beam gain $g_{s,i,j}$ for the satellite beam j, an adjusted antenna gain $g_{u,i}$ of the one UT towards the satellite i, a path gain/loss $g_{l,i}$, for each satellite i, from the one UT to the satellite i, and a system link budget model.

According to a further example embodiment, the method further comprises determining a handover time $t_{ho}$, where $t_{m-1} < t_{ho} \leq t_m$, at which the estimated signal strength of the satellite beam that is currently servicing the one UT is equal to the estimated signal strength of the candidate beam, by interpolating the signal strength estimates between $t_{m-1}$ and $t_m$; and determining to handover the one UT, at the time $t_{ho}$, from the satellite beam that is currently servicing the one UT to the candidate beam.

According to a further example embodiment of the method, the determination of the estimated signal strength as seen at the one UT, for each of the plurality of the satellite beams of one or more of the satellites that is within the view of an antenna of the one UT, comprises, for each instant of time $t_n$: (i) determining a position $p_{s,i}$ and pitch, roll and yaw attitudes $p_i$, $r_i$, $y_i$ for each satellite i of the one or more of the satellites; (ii) determining a position $p_u$ of the one UT; (iii) determining, based on a line of sight vector $(p_u-p_{s,i})$ from the satellite i to the one UT and based on the satellite pitch, roll and yaw attitudes $y_i$, $p_i$, $r_i$, an elevation $\theta_{i,j}$ and an azimuth $\varphi_{i,j}$ of the one UT for each satellite beam j for each satellite i of the one or more of the satellites, with respect to reference directions of an antenna of the satellite, and determining a beam gain $g_{s,i,j}$ for the satellite beam j; (iv) determining an adjusted antenna gain $g_{u,i}$ of the one UT towards the satellite i; (v) determining, based on a range $\|(p_{s,i}-p_u)\|$ from the one UT to the satellite i, a path gain/loss $g_{l,i}$ for each satellite i; and (vi) determining the estimated signal strength $S_{i,j}(t_n)$ of the beam j of the satellite i as seen at the one UT at time $t_n$ based on a system link budget model and the determined gains $g_{s,i,j}$, $g_{u,i}$, $g_{l,i}$.

According to a further example embodiment, the method further comprises detecting one or more system impairments that each respectively affects one or more of the determined optimal characteristics regarding the satellite beams of each of the one or more of the satellites and regarding the one UT, wherein the one or more system impairments result in an inaccuracy of the determined estimated signal strengths, determining the one or more optimal characteristics that are respectively affected by each of the one or more impairments, determining an actual or estimated error level for each of the one or more impairments for each instant of time $t_n$, and accounting for the determined error level for each of the one or more impairments, for each instant of time $t_n$, as an adjustment in the respective optimal characteristic for the determination of the estimated signal strength at the respective instant of time $t_n$. By way of example, the one or more system impairments include variation in satellite attitude and variation in antenna gain patterns relative to the respective determined characteristics for a respective one or more of the one or more of the satellites, and error in position of the one UT relative to the respective determined characteristics for the one UT. By way of further example, the detection of the one or more system impairments is based on one or more of a handover of each of one or more of the UTs to an incorrect satellite beam, a handover of one or more of each of the UTs at an incorrect handover time, and an determination of an inaccurate estimated signal strength for respective estimated signal strength determinations for one or more of the UTs.

According to a further example embodiment, the method further comprises determining existence of a variation of satellite attitude relative to the respective determined optimal characteristics for a one of the satellites j, measuring, by each of a plurality of the UTs within a footprint of the satellite j, a signal strength of a satellite beam k of the satellite j that is currently servicing the UT and a signal strength of a neighboring candidate satellite beam l of the satellite j at a time t, determining an error level for the variation of the satellite attitude based on the satellite beam signal strengths for the satellite beams k and l of the satellite j measured by each of the plurality of UTs within the footprint of the satellite j, and accounting for the determined error level for the variation of the satellite attitude, for the instant of time $t_n=t$, as an adjustment in the respective optimal characteristic for the determination of the estimated signal strength at the respective instant of time $t_n$.

According to a further example embodiment, the method further comprises determining existence of a variation of an antenna beam gain pattern relative to the respective determined optimal characteristics for a beam k of a one of the satellites j, measuring, by each of a plurality of the UTs within a footprint of the satellite j, a plurality of signal strength samples for a range of azimuth and elevation angles of the beam k over a period of time, determining an error level for the variation of the antenna beam gain pattern by determining, for each signal strength sample, an estimated beam gain at the respective azimuth and elevation, and determining a beam gain model that can provide an estimate of the gain of the beam k at any desired azimuth and elevation, and accounting for the determined error level for the variation of the antenna beam gain pattern as an adjustment in the respective optimal characteristic for the determination of the estimated signal strength.

In accordance with further example embodiments, a device is provided for prediction of user terminal handovers in a satellite data communications network that includes a plurality of satellites and a plurality of user terminals (UTs), wherein each satellite services a plurality of cells via a plurality of respective satellite beams at any given instant of time. The device comprises one or more processors. The one or more processors are configured to determine a plurality of respective optimal characteristics regarding the satellite beams of each of one or more of the satellites and regarding a one of the UTs. The one or more processors are further configured to determine a time increment δt and a number of intervals N over which the prediction is to be performed. The one or more processors are further configured to determine, for each of a plurality of the satellite beams of one or more of the satellites that is within the view of an antenna of the one UT, for each of a plurality of instants of time $t_n$, where $t_n=t_0+n\delta t$, for $n\in[0, 1, \ldots, N-1]$, an estimated signal strength as seen at the one UT, wherein each estimated signal strength is determined based on one or more of the optimal characteristics relative to the respective time $t_n$ for which the estimated signal strength is being determined. The one or more processors are further configured to determine a next instant of time $t_m$ at which the estimated signal strength of a one candidate beam of the plurality of the satellite beams of the one or more of the satellites that is within the view of an antenna of the one UT is greater than or equal to the estimated signal strength of a one of the plurality of the satellite beams of the one or more of the satellites that is currently servicing the one UT. The one or more processors are further configured to determine to handover the one UT, at the time $t_m$, from the satellite beam that is currently servicing the one UT to the candidate beam. By way of example, the respective optimal characteristics regarding the satellite beams of each of one or more of the satellites and regarding the one UT comprise a position $p_{s,i}$ and pitch, roll and yaw attitudes $p_i$, $r_i$, $y_i$ for each of the one or more of the satellites, a position $p_u$ of the one UT, an elevation $\theta_{i,j}$ and an azimuth $\varphi_{i,j}$ of the one UT for each satellite beam j for each satellite i of the one or more of the satellites, with respect to reference directions of an antenna of the satellite, and a beam gain $g_{s,i,j}$ for the satellite beam j, an adjusted antenna gain $g_{u,i}$ of the one UT towards the satellite i, a path gain/loss $g_{l,i}$, for each satellite i, from the one UT to the satellite i, and a system link budget model.

According to a further example embodiment of the device, the one or more processors are further configured to determine a handover time $t_{ho}$, where $t_{m-1}<t_{ho}\leq t_m$, at which the estimated signal strength of the satellite beam that is currently servicing the one UT is equal to the estimated signal strength of the candidate beam, by interpolating the signal strength estimates between $t_{m-1}$ and $t_m$, and determine to handover the one UT, at the time $t_{ho}$, from the satellite beam that is currently servicing the one UT to the candidate beam.

According to a further example embodiment of the device, the determination of the estimated signal strength as seen at the one UT, for each of the plurality of the satellite beams of one or more of the satellites that is within the view of an antenna of the one UT, comprises, for each instant of time $t_n$: (i) determining a position $p_{s,i}$ and pitch, roll and yaw attitudes $p_i$, $r_i$, $y_i$ for each satellite i of the one or more of the satellites; (ii) determining a position $p_u$ of the one UT; (iii) determining, based on a line of sight vector $(p_u-p_{s,i})$ from the satellite i to the one UT and based on the satellite pitch, roll and yaw attitudes $y_i$, $p_i$, $r_i$, an elevation $\theta_{i,j}$ and an azimuth $\varphi_{i,j}$ of the one UT for each satellite beam j for each satellite i of the one or more of the satellites, with respect to reference directions of an antenna of the satellite, and determining a beam gain $g_{s,i,j}$ for the satellite beam j; (iv) determining an adjusted antenna gain $g_{u,i}$ of the one UT towards the satellite i; (v) determining, based on a range $\|(p_{s,i}-p_u)\|$ from the one UT to the satellite i, a path gain/loss $g_{l,i}$ for each satellite i; and (vi) determining the estimated signal strength $S_{i,j}(t_n)$ of the beam j of the satellite i as seen at the one UT at time $t_n$ based on a system link budget model and the determined gains $g_{s,i,j}$, $g_{u,i}$, $g_{l,i}$.

According to a further example embodiment of the device, the one or more processors are further configured to detect one or more system impairments that each respectively affects one or more of the determined optimal characteristics regarding the satellite beams of each of the one or more of the satellites and regarding the one UT, wherein the one or more system impairments result in an inaccuracy of the determined estimated signal strengths, determine the one or more optimal characteristics that are respectively affected by each of the one or more impairments, determine an actual or estimated error level for each of the one or more impairments for each instant of time $t_n$, and account for the determined error level for each of the one or more impairments, for each instant of time $t_n$, as an adjustment in the respective optimal characteristic for the determination of the estimated signal strength at the respective instant of time $t_n$. By way of example, the one or more system impairments include variation in satellite attitude and variation in antenna gain patterns relative to the respective determined characteristics for a respective one or more of the one or more of the satellites, and error in position of the one UT relative to the respective determined characteristics for the one UT. By way of further example, the detection of the one or more system impairments is based on one or more of a handover of each of one or more of the UTs to an incorrect satellite beam, a handover of one or more of each of the UTs at an incorrect handover time, and an determination of an inaccurate estimated signal strength for respective estimated signal strength determinations for one or more of the UTs.

According to a further example embodiment of the device, the one or more processors are further configured to determine existence of a variation of satellite attitude relative to the respective determined optimal characteristics for a one of the satellites j, measure, by each of a plurality of the UTs within a footprint of the satellite j, a signal strength of a satellite beam k of the satellite j that is currently servicing the UT and a signal strength of a neighboring candidate satellite beam l of the satellite j at a time t, determine an error level for the variation of the satellite attitude based on the satellite beam signal strengths for the satellite beams k and l of the satellite j measured by each of the plurality of UTs within the footprint of the satellite j, and account for the determined error level for the variation of the satellite attitude, for the instant of time $t_n=t$, as an adjustment in the respective optimal characteristic for the determination of the estimated signal strength at the respective instant of time $t_n$.

According to a further example embodiment of the device, the one or more processors are further configured to determine existence of a variation of an antenna beam gain pattern relative to the respective determined optimal characteristics for a beam k of a one of the satellites j, measure, by each of a plurality of the UTs within a footprint of the satellite j, a plurality of signal strength samples for a range of azimuth and elevation angles of the beam k over a period of time, determine an error level for the variation of the antenna beam gain pattern by determining, for each signal strength sample, an estimated beam gain at the respective azimuth and elevation, and determine a beam gain model that can provide an estimate of the gain of the beam k at any desired azimuth and elevation, and account for the determined error level for the variation of the antenna beam gain pattern as an adjustment in the respective optimal characteristic for the determination of the estimated signal strength.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Figure 1:
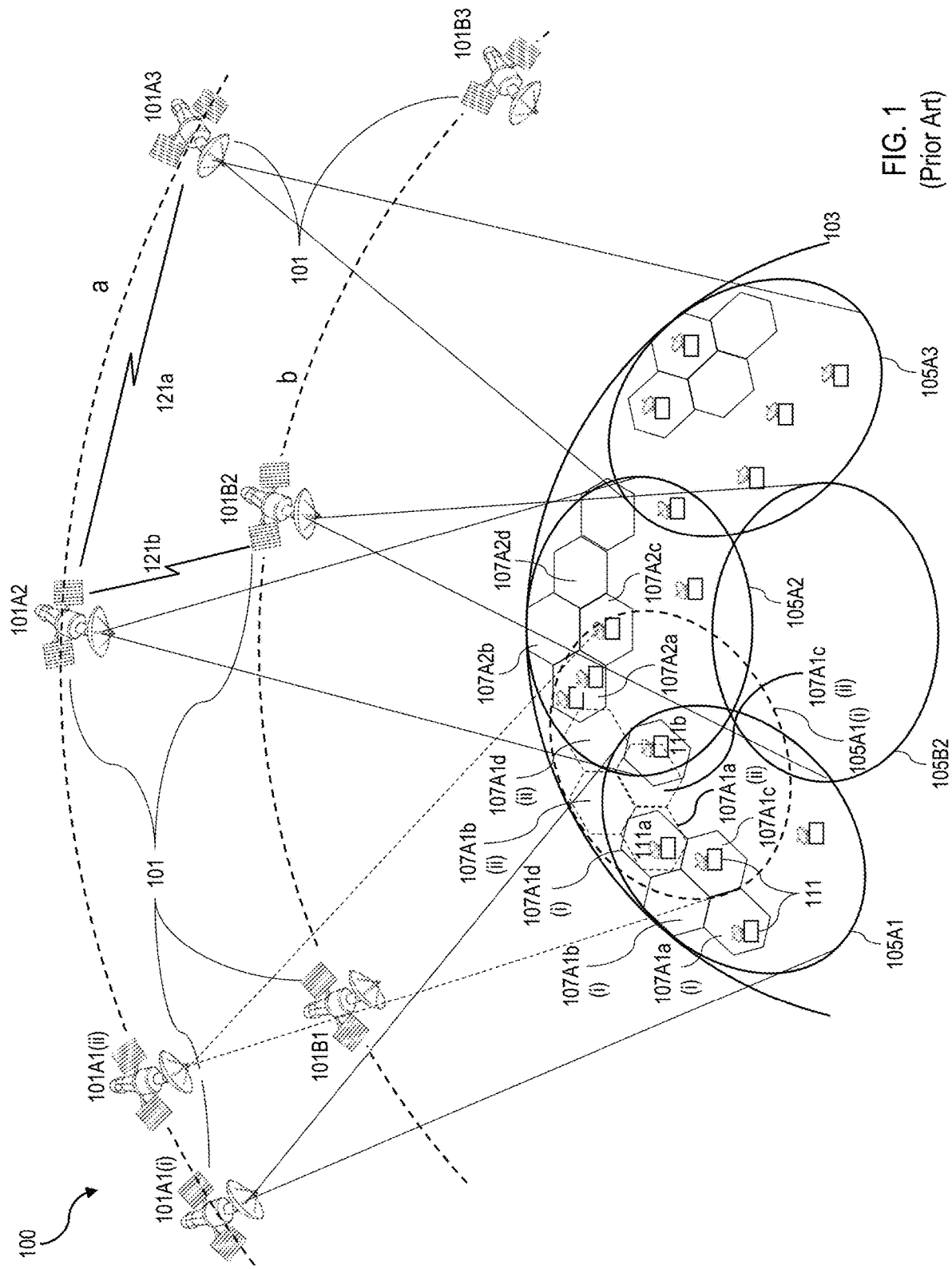
FIG. 1 illustrates an example of a conventional wireless communications system (e.g., a LEO or MEO satellite system)

Approaches for efficient and accurate prediction of handovers of user terminals between radio beams in non-stationary wireless communications systems (e.g., non-geosynchronous orbit (NGSO) satellite communications systems, such as low earth orbit (LEO) or medium earth orbit (MEO) satellite communications systems), are provided, which achieve improved system capacity utilization and improved user experience (e.g., shorter interruptions, higher average signal quality & data rates). In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a processor, module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 1 illustrates an example of a conventional wireless communications system (e.g., a LEO or MEO satellite system). While the following description of example embodiments of the present invention is in the context of a low earth orbit (LEO) satellite system, as would be appreciated, the aspects and concepts described herein would be applicable to any communications system employing one or more non-geosynchronous orbit (NGSO) airborne communications platforms that travel or move relative to the surface of the Earth (e.g., low earth orbit (LEO) satellite systems, medium earth orbit (MEO) satellite systems, and high altitude platform (HAP) based systems).

With reference to FIG. 1, the satellite communications system 100 includes a plurality of satellites 101, which may hereinafter be referred to as a constellation. The satellites of the constellation travel around the Earth 103 in different orbital planes, such as the orbital planes a and b depicted in the Figure. For example, the satellites 101A1, 101A2, 101A3 travel in the orbital plane a, and the satellites 101B1, 101B2, 101B3 travel in the orbital plane b (an orbital plane may also be referred to herein simply as a plane or orbit). By way of example, in an orbital plane, the satellites may be distributed at relatively even distances apart so that the angular position between each adjacent pair of satellites is substantially uniform, and the orbital planes may be highly inclined relative to the equator to provide global coverage (e.g., the angle formed between the orbital plane and the equatorial plane is greater than 70 degrees). By way of further example, the orbital planes may also distributed in a substantially uniform manner. A satellite 101, in accordance with example embodiments, employs a multiple beam antenna (e.g., a phased array antenna) that illuminates a respective geographic region or footprint on the surface of the Earth, such as the regions 105A1, 105A2, 105A3, 105B2 of the satellites 101A1, 101A2, 101A3, 101B2, respectively. Each geographic region illuminated by a satellite antenna is further divided into spot beams or cells 107. Each spot beam or cell provides data communication services to the respective ground terminals 111 located within that cell. Further, each satellite also may employ one or more inter-satellite links (ISLs) providing for data communications between that satellite and neighboring satellite, such as the ISL 121a between the satellites 101A2 and 101A3 and the ISL 121b between the satellites 101A2 and 101B2. Further, each satellite may have one or more antennas (e.g., spot beam antennas, such as planar phased array antennas), where each antenna will radiate and cover a respective footprint area (e.g., a footprint area 105) on the surface of the Earth.

As a satellite moves through its orbit, the footprint/beam of the satellite sweeps across the surface of the Earth relative to the movement of the satellite. Further, with a traditional LEO satellite, for example, the satellite antenna generates a cell pattern within the antenna footprint according to the geometry and coefficients applied to the phased array antenna elements, where the cell pattern is fixed relative to the antenna (e.g., based on a coordinate system relative to the antenna). With a cell pattern that is fixed relative to the antenna, as the satellite travels in its orbit and the cell pattern sweeps across the surface of the earth, the respective shape of each cell will vary relative to the angle of inclination of the satellite beam and the distance of the satellite from the earth (as the orbit of a satellite is not necessarily circular and is typically more elliptical in shape, and thus the angle of inclination of the satellite beam relative to the Earth and the distance of the satellite from the Earth changes throughout the orbital path). Consequently, as the satellite beam/cell pattern sweeps across the surface of the earth, the particular servicing of a given beam/cell (and the servicing of the respective terminals within that cell) will change rapidly, and a given terminal will undergo a relatively rapid progression of handovers. Accordingly, while a terminal remains within the footprint of the satellite, the terminal will undergo a sequence of intra-satellite (beam-to-beam) handovers within the satellite footprint as the respective satellite beams move relative to the position of the terminal. For example, with reference to FIG. 1, as the satellite 101A1 moves from position 101A1(*i*) (with the cell/beam footprint depicted in solid lines) to the position 101A1(*ii*) (with the cell/beam footprint depicted in dashed lines), the terminal 111*a* may undergo handovers from the cell/beam 107A1*d* (at position (i)) to the cell/beam 107A1*b* and then from the cell/beam 107A1*b* to the cell/beam 107A1*a* (at position (ii)). Further, as a terminal moves out of the footprint of a current satellite and into the footprint of a subsequent satellite, the terminal will undergo an inter-satellite handover from a beam of the current satellite to a beam of the subsequent satellite. For example, with reference to FIG. 1, as the satellites 101A1 and 101A2 move, and the terminal 111*b* approaches the edge of the footprint 105A2, the terminal may undergo a handover to a beam of the footprint 105A1 that moves over the terminal at that time (e.g., the cell/beam 107A1*c*). Alternatively, the satellite antenna may be configured to generate a cell pattern within the antenna footprint according to the geometry and coefficients applied to the phased array antenna elements, where the cell pattern is fixed relative to the Earth (e.g., based on a coordinate system relative to the surface of the Earth). With a cell pattern that is fixed relative to the surface of the Earth, the antenna beams are dynamically adjusted as the satellite moves so as to service each of the fixed cells of the cell pattern while the cell is within the footprint of the antenna. In this case, while terminal handovers are still required as the satellite moves, the frequency of the handovers is reduced. An example of a system that employs such a fixed ground-based cell approach is described in copending U.S. patent application Ser. No. 15/859,580.

In wireless systems (e.g., terrestrial cellular or satellite) that use multiple radio beams (or cells) to provide service over an extended geographic area, where a user terminal (UT) located somewhere in the service area may see signals from one or more beams at the same time, and then has to select (autonomously or by command from the network gateway/base station) and switch to the optimal beam. When there is relative motion between the UT and the beam (e.g., due to movement of the UT, the beam, or both), then this selection and switching (handover) has to be performed each time the UT moves between beams. In terrestrial and geosynchronous orbit (GEO) systems, handovers may occur every few minutes or hours, depending on the size of the beams and the speed of the UT. In NGSO systems, however, handovers may be required as often as every few seconds due to the high speed that the radio beams move over the ground (e.g., 6 km/sec or 21,600 km/hr for a LEO satellite at 1400 km altitude). This higher rate of handovers (e.g., see Table 1) makes it increasingly important to make sure that each handover occurs at the optimal time and with minimum interruption and overhead.

TABLE 1

Examples of Handover Rates in Different Systems

| System Type | Beam/Cell Size, km | Relative Ground Speed, km/hr | Time Between Handovers |
|---|---|---|---|
| Terrestrial Cellular, vehicular UT | 10 | 100 | 6 min |
| GEO spot beam, vehicular UT | 500 | 100 | 5 hr |
| GEO spot beam, aeronautical UT | 500 | 1,000 | 30 min |
| LEO spot beam, stationary or mobile UT | 200 | 20,000 | 36 sec |

Figure 2A:
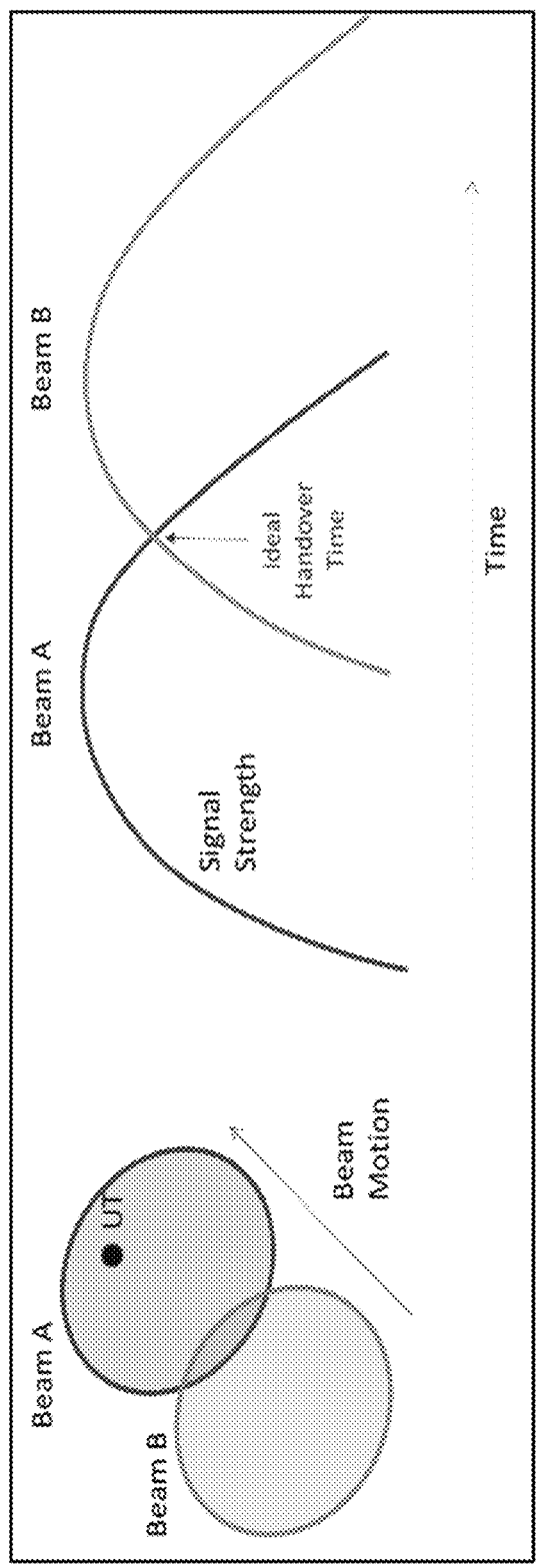
FIG. 2A illustrates an example of the signal strength of two radio beams as seen by a UT and the ideal handover point, as the beams move relative to the position of the UT.

FIG. 2A illustrates an example of the signal strength of two radio beams as seen by a UT and the ideal handover point, as the beams move relative to the position of the UT. When the radio beams are moving relative to the UT, then the signal strengths of the beams as seen by the UT vary with time as the UT's relative position within a beam passes from the center of the beam to the beam edge and into the next beam. The ideal handover time is when the signal strengths of the two beams are equal, as shown in the Figure. Note that although FIG. 1 shows two beams for simplicity, there may be additional beams involved in the general case.

Conventional Measurement-Based Handover

Figure 2B:
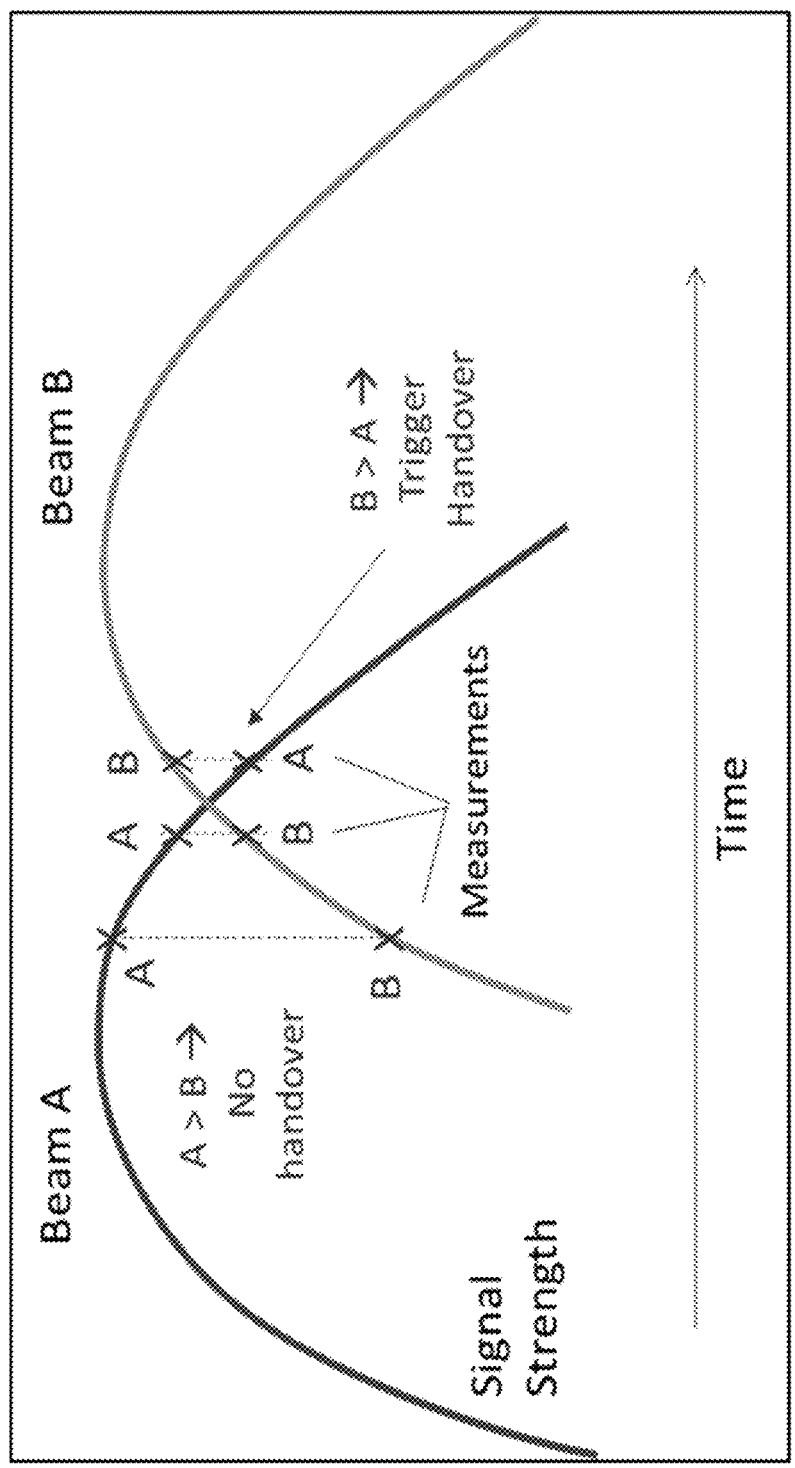
FIG. 2B illustrates a conventional method for the determination of the handover in a mobile wireless communications systems.

FIG. 2B illustrates a conventional method for the determination of the handover in a mobile wireless communications systems. In a conventional mobile wireless system (e.g., terrestrial cellular or satellite), a common method of deciding when to hand over between beams (cells) is based on signal strength measurements made by the UT. In such a scheme, as illustrated in FIG. 2B, the UT measures the current (serving) beam as well as any other available (candidate) beams at various points (depicted as points A for beam A and points B for beam B), and conveys the measurements to the core network (e.g., the MME). The network then commands the UT to perform the handover when the signal strength of a candidate beam becomes "sufficiently better" than that of the serving beam (depicted as B>A).

While this scheme is simple and effective, it has some drawbacks that are exacerbated in NGSO systems. For example, the process of making measurements and conveying them to the network adds signaling overhead and may also require interrupting traffic during measurements (measurement gaps). For this reason, it is desirable to reduce measurements to a minimum. Further, the time between successive measurements and the latency involved in conveying measurements to the network adds delay to the decision. The network typically also factors in some hysteresis to avoid "ping-pong" handovers and to account for measurement uncertainties. This can delay the handover decision to a point where it is sub-optimal. The timeliness of the handover decision can be improved by making frequent measurements, but this, in turn, increases the measurement overhead.

In terrestrial and GEO systems, the rate at which signal strength changes with UT/beam movement is slow enough that some delay in the handover decision is not detrimental to the overall system. However, in NGSO systems, rapid beam movement and frequent handovers require that handover decisions be more accurately made.

Handover Prediction

To address such disadvantages with handover approaches in conventional systems, therefore, in accordance with example embodiments of the present invention, approaches for prediction of the target beam and the approximate optimal time for handover of a UT are provided. The following describes a number of example techniques according to example embodiments for determining such predictions.

Ideal Prediction (No Measurements)

According to one such example embodiment, the handover prediction is based on knowledge of certain data (e.g., based either on a priori knowledge or determined by estimation methods described herein). By way of example, such data may be based on ideal or optimal characteristics of the satellites and user terminals of the system (e.g., based on theoretical or estimated specifications and known or planned orbital trajectory of a respective satellite and on specifications and known movement of a respective user terminal). By way of example, the following data is known with sufficient accuracy: (i) $p_{s,i}(t)$, $v_{s,i}(t)$—the position and velocity vectors of the $i^{th}$ satellite (or airborne platform) as a function of time; (ii) $y_i(t)$, $p_i(t)$, $r_i(t)$—the attitude angles (yaw, pitch and roll) of the $i^{th}$ satellite (and consequently the orientation in space of the satellite antenna) as a function of time; (iii) $p_u(t)$, $v_u(t)$—the position and velocity of the UT as a function of time; (iv) $g_{s,i,j}(\theta, \varphi)$—the satellite antenna gain pattern for the $j^{th}$ beam of the $i^{th}$ satellite; (v) $g_u$—the UT antenna gain (it is assumed that the UT uses a steered directional antenna that tracks the NGSO satellites). Here "sufficient accuracy" means that the error in the prediction made using these data is within acceptable limits, and the "functions of time" need only be valid for the period over which the prediction is to be done, e.g. the next few seconds.

Figure 3:
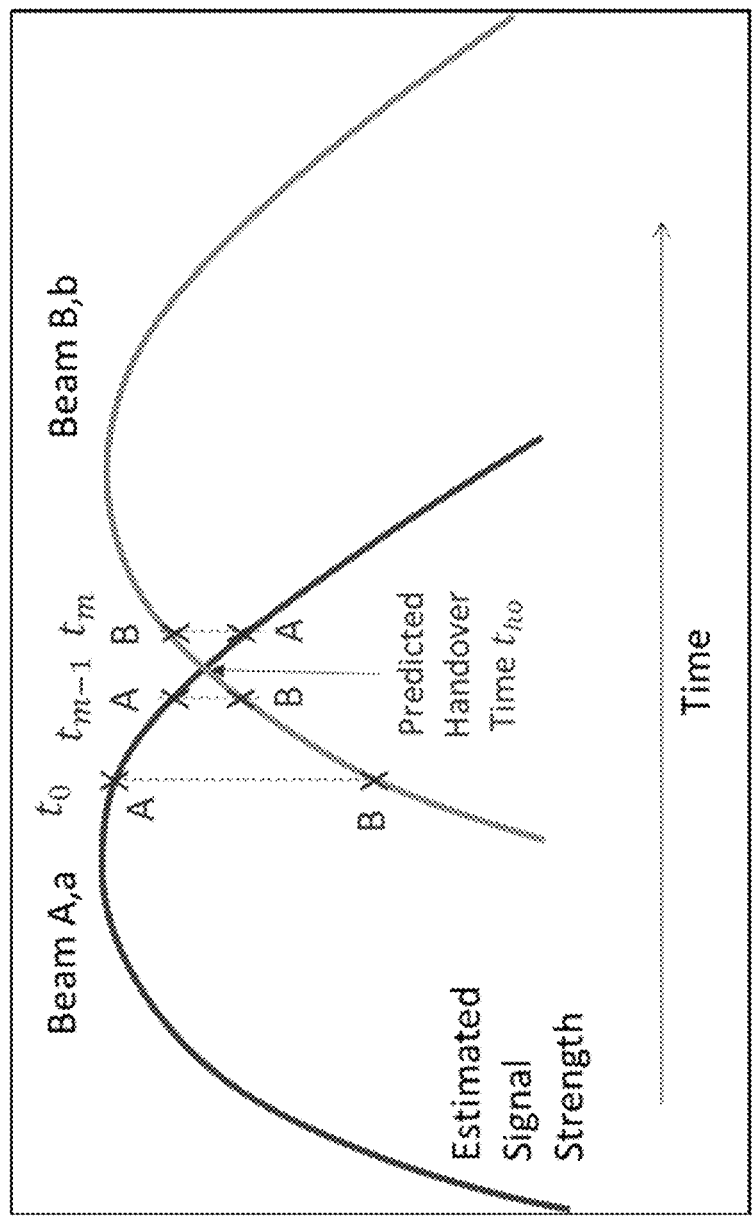
FIG. 3 illustrates an example approach for UT handover prediction based on knowledge of certain data (e.g., based either on a priori knowledge or determined by estimation methods described herein), in accordance with example embodiments of the present invention.

By way of further example, as illustrated in FIG. 3, a method to predict handovers based on such information is as follows:

1. Choose a suitable time increment δt and the number of intervals N over which the prediction is to be done (e.g., increments of 1 second over 15 intervals).
2. For each instant of time $t_n = t_0 + n\delta t$ for $n \in [0, 1, \ldots, N-1]$:
    (a) For each satellite $i \in I$, the set of satellites in the field of view of the UT, calculate the position $p_{s,i}$ and pitch, roll and yaw attitudes $p_i$, $r_i$, $y_i$ of the satellite;
    (b) Calculate the position $p_u$ of the UT.
    (c) From the satellite-UT line of sight vector $(p_u - p_{s,i})$ and the satellite attitude angles, calculate the elevation $\theta_{i,j}$ and azimuth $\varphi_{i,j}$ of the UT with respect to the satellite antenna reference directions, for each beam j of each satellite i, and look up the beam gain $g_{s,i,j}$.
    (d) Calculate the adjusted UT antenna gain $g_{u,i}$ towards satellite i—in general, the gains are independent of elevation and azimuth for steered directional antennas, however, they could be different in certain cases at lower elevation angle (e.g., for electronically-steered antennas, a scan loss factor may be required).

(e) From the UT-satellite range $\|(p^{s,i} - p_{u,i})\|$, calculate the UT-satellite path gain (loss) $g_{l,i}$ for each satellite i.

(f) Using the system link budget model and the gains $g_{s,i,j}$, $g_{u,i}$, $g_{l,i}$ for the satellite antenna, UT antenna and the link at time $t_n$, calculate $S_{i,j}(t_n)$, the estimated signal strength for the signal from satellite i, beam j as seen at the UT at time $t_n$.

3. Assuming that the current serving beam for the UT at time $t_0$ is beam a of satellite A, then find the next instant of time $t_m$ at which the estimated signal strength of some other candidate, say beam b of satellite B (could be the same or a different satellite) is greater than or equal to the estimated signal strength of beam a of satellite A, i.e., $(S_{B,b}(t_m) - S_{A,a}(t_m)) \geq 0$.

4. Determine the ideal handover time $t_{ho}$ when the estimated signal strength of the current serving beam for the UT will be equal to the estimated signal strength of the other candidate beam, where $t_{m-1} < t_{ho} \leq t_m$, by interpolation of the signal strength estimates between $t_{m-1}$ and $t_m$.

The metric used for handover prediction is the difference between the estimated signal strengths of two beams. The use of the difference in estimates eliminates a number of common-mode estimation errors, such as UT pointing error, differences in calibration, channel impairments, etc. This approach facilitates prediction of handovers up to $N\delta t$ in the future.

Practical Impairments

In the previous section, the signal strength estimates are assumed to be accurate enough so that measurements from the UT are not required, and hence eliminates measurement overhead for the UT. In practice, however, there may be a number of instances where the signal strength data is not of sufficient accuracy. Such instances include (i) where the satellite attitude control may be faulty, resulting in significant errors in the satellite attitude angle data, there may be uncertainty in the knowledge of the satellite position and velocity, (ii) where the satellite antenna gain patterns may differ significantly from expected patterns, for example, due to manufacturing defects or damage to the radiating elements, (iv) where the UT may be moving fast and there may be uncertainty in the knowledge of its position. In order to address such impairments, according to a further example embodiment, the foregoing approach may be augmented by signal strength measurements as described below.

Detection of Impairments

Figure 4:
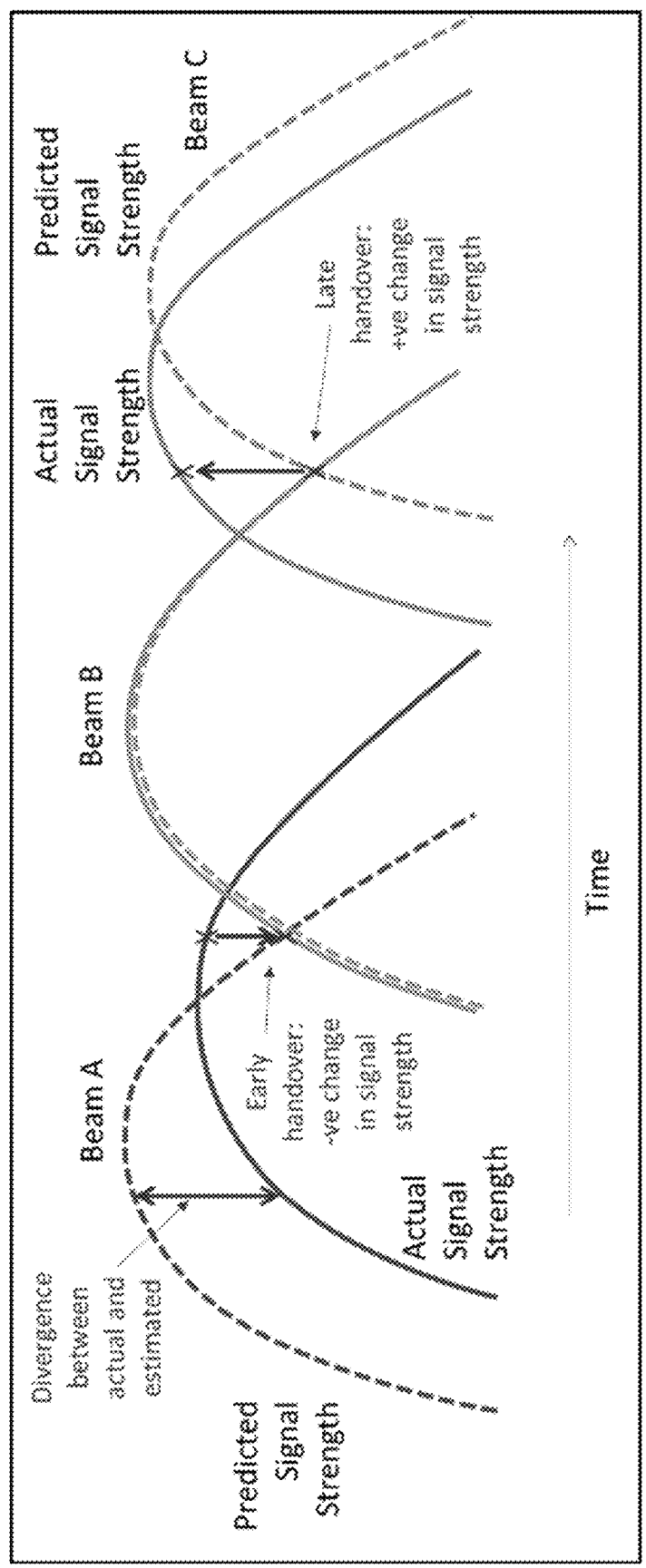
FIG. 4 illustrates example instances where the approach of FIG. 3 results in a failure to predict a handover with sufficient accuracy due to certain respective system impairments, in accordance with example embodiments of the present invention.

Initially, in the absence of information to the contrary, the system may assume that ideal conditions exist and attempt to predict handovers using the assumptions in the "Ideal Prediction" method, described above. In instances where this method fails to predict handovers accurately due to the presence of impairments as mentioned above, for example, the following types of events may be observed (as illustrated in FIG. 4): (i) Handover to incorrect beam—the UT is unable to acquire or connect to the designated target beam, and the UT instead selects a different beam; (ii) Incorrect handover time—the UT is able to acquire the target beam, but there is a large change in signal quality immediately after the handover, which indicates that the handover was performed either too late (e.g., in the event of a large positive change in signal quality) or too early (e.g., in the event of a large negative change in signal quality); (iii) Incorrect signal strength estimate—the estimated signal strength varies significantly from the observed values. If such events are observed for multiple UTs served by a specific satellite or beam, then some type of systematic impairment may be indicated. Information about the type of impairment may be obtained by collecting and analyzing the number of such events and the magnitude of the signal strength difference associated with each. It may even be possible to characterize the impairment if sufficient data is collected, as described in the following sections.

Attitude Error Estimation

Errors in satellite attitude can be errors in pitch, roll, yaw, or a combination thereof. If the source of the problem is known to be a specific type of malfunction in the attitude control system of the spacecraft, then the type of attitude error may be known (although the magnitude may not), which may simplify the task of characterizing the error. According to a further example embodiment, therefore, an algorithm is provided for estimation of the attitude error of the satellite, which estimation can then be factored into the respective handover predictions for UTs with respect to that satellite.

Figure 5:
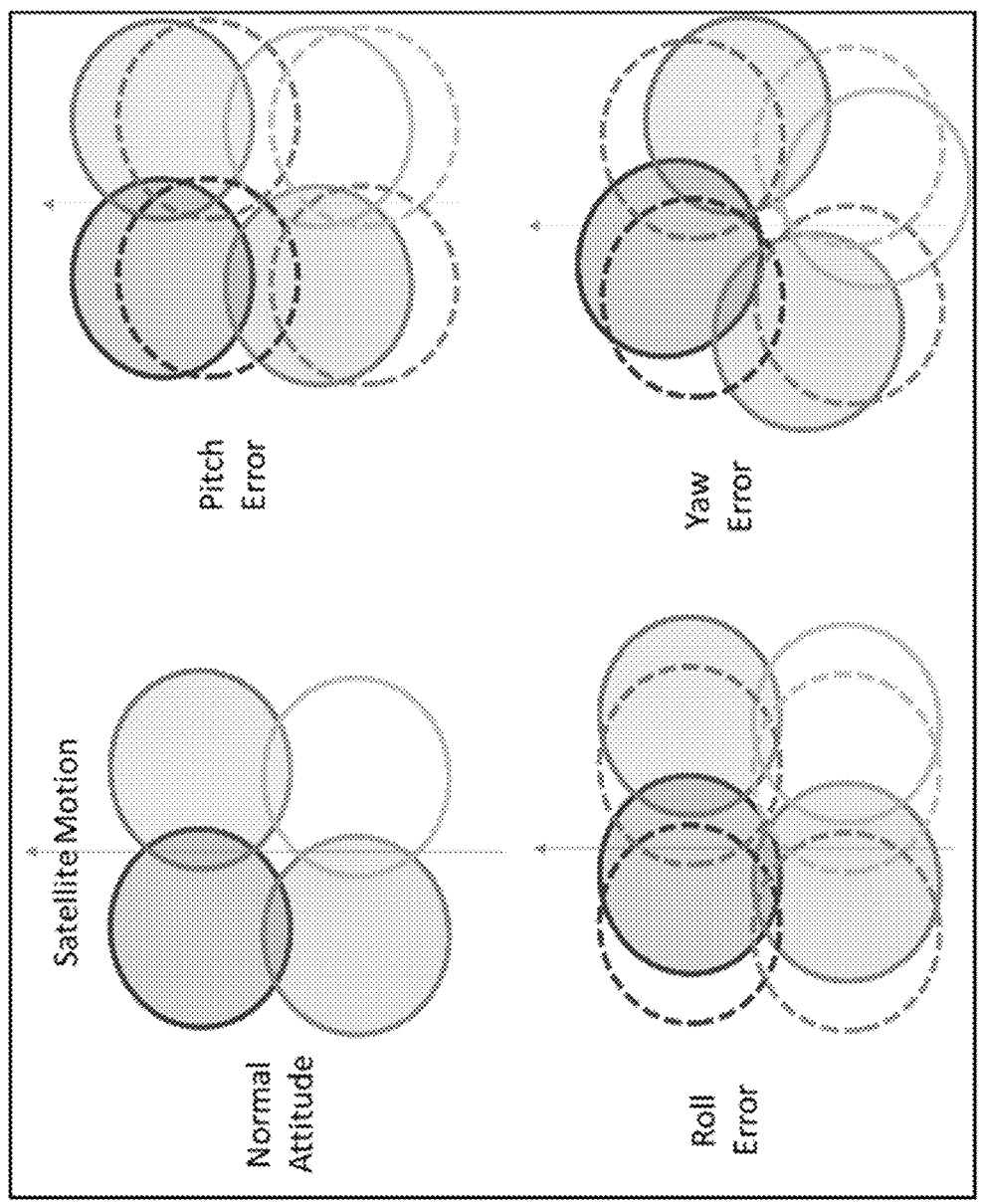
FIG. 5 illustrates the effects of pitch, roll and yaw errors on the projected footprint of a satellite with four spot beams, in accordance with example embodiments of the present invention.
Figure 6:
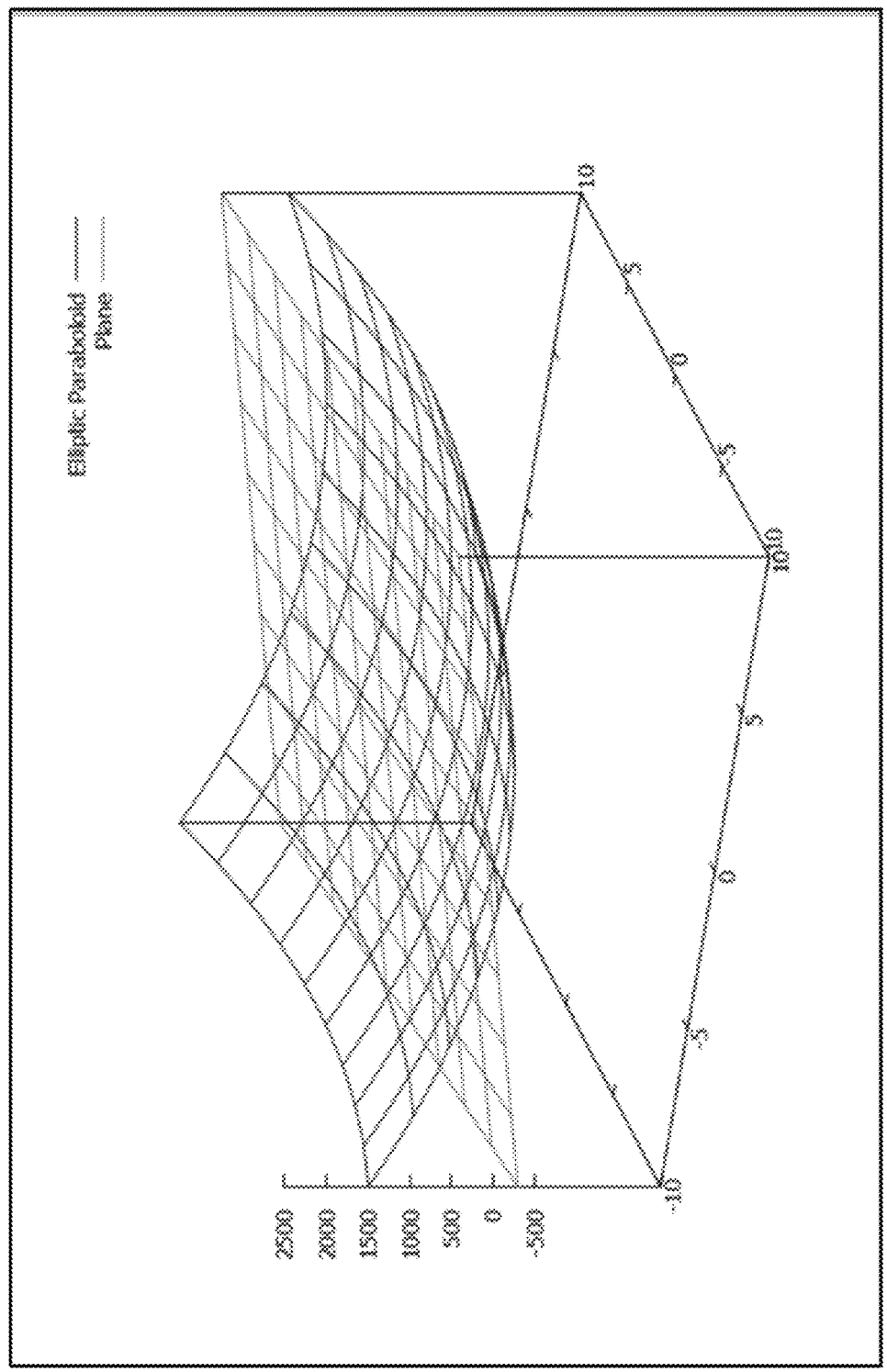
FIG. 6 illustrates an example plane and elliptic paraboloid fit surface for a grid square for a Piecewise Surface Fitting approach, in accordance with example embodiments of the present invention.

FIG. 5 illustrates the effects of pitch, roll and yaw errors on the projected footprint of a satellite with four spot beams, where the dashed circles show the theoretical (expected) projections of the beams, and the shaded circles show their actual projections. Pitch errors manifest as either early handovers or late handovers for most or all UTs. Roll errors manifest as early or late handovers or failed handovers to neighboring satellites for UTs at the left and right margins of the satellite footprint. Yaw errors manifest as early handovers for some UTs and late handovers for others, depending on their location in the satellite footprint.

By way of example, attitude error estimation may rely on the fact that the effects of satellite position and pointing error on the handover time of all the UTs in the coverage are of the satellite are correlated, and hence measurements from multiple UTs can be combined to develop a continuously-updated estimate of the satellite attitude error. In a sense, many UTs in the coverage of a satellite are considered as a set of "noisy sensors" that each provide some "measurement" of the current satellite attitude errors. The attitude error estimation algorithm is thus a sort of "sensor fusion" algorithm that combines the data from many imperfect sensors to develop a much better estimate of the measured quantity (attitude error) than any individual sensor could provide.

Typically, the UT sees a strong signal from one beam of a satellite, and may see weaker signals from neighboring beam(s). If the satellite attitude changes, there is a corresponding change in the signal strengths of both beams (active and candidate) measured by the UT, such that one of the signals becomes stronger and the other becomes weaker. The difference in the two signals measured by the UT thus provides a measurement of the satellite position and attitude error.

If the UT position and the satellite position and attitude are known, an estimate of the "sensor reading" can be calculated (which is the basis of the "ideal prediction" method). Further, assuming that systematic common-mode errors are removed by using the difference between the two beam measurements, the UT measurement of the difference between the signal strengths of the neighbor beams can be assumed to have only a random, normally-distributed zero-mean measurement error. It is also assumed that the measurement errors of different UTs are not correlated and have the same variance. It is further assumed that the ephemeris errors are negligible and the method focuses only on the estimation of attitude errors. Accordingly, the attitude error can be estimated using the following method:

Let the function $S_{i,j,k}(x, y, z, r, p, w)$ be the estimated signal strength in dB observed by UT i from satellite j, beam k at some time t, when the position coordinates of the satellite are (x, y, z) and its roll, pitch and yaw angles are (r, p, w) respectively.

Assuming that it is possible to calculate the partial derivatives of the function $S_{i,j,k}(x, y, z, r, p, w)$ with respect to (r, p, w), the vector-valued gradient, $\nabla S_{i,j,k}$ at time t, can be calculated. Since S is in the log domain, $\nabla S$ has units of dB/km and dB/degree:

$$\nabla S_{i,j,k} = \begin{bmatrix} \partial S_{i,j,k}/\partial r \\ \partial S_{i,j,k}/\partial p \\ \partial S_{i,j,k}/\partial w \end{bmatrix} \quad (1)$$

It may be difficult or impossible to determine the partial derivatives analytically, so they may be determined by numerical approximation if necessary, by making small perturbations in (r, p, w).

Assuming the attitude errors ($\delta r$, $\delta p$, $\delta w$) are sufficiently small, the estimated signal strength at (x, y, z, r+$\delta r$, p+$\delta p$, w+$\delta w$) can be estimated by the truncated Taylor series expansion of $S_{i,j,k}$ at (x, y, z, r, p, w):

$$S_{i,j,k}(x,y,z,r+\delta r,p+\delta p,w+\delta w) \approx S_{i,j,k}(x,y,z,r,p,w) + (\nabla S_{i,j,k})^T p \quad (2)$$

where $$p = \begin{bmatrix} \delta r \\ \delta p \\ \delta y \end{bmatrix}$$

represents the attitude errors for satellite j.

Let $s_{i,j,k}$ be the measured signal strength of satellite j, beam k reported by UT i at time t. Then difference between the measurements of two beams k and l is:

$$s_{i,j,k} - s_{i,j,l} = S_{i,j,k}(x,y,z,r+\delta r,p+\delta p,w+\delta w) - S_{i,j,l}(x,y,z,r+\delta r,p+\delta p,w+\delta w) + e_i \quad (3)$$

where $e_i$ the measurement error of UT(i), which we assume is zero-mean and normally distributed.

Substituting (2) in (3) and rearranging results in:

$$(s_{i,j,k} - s_{i,j,l}) - (S_{i,j,k}(x,y,z,r,p,w) - S_{i,j,l}(x,y,z,r,p,w)) = (\nabla S_{i,j,k} - \nabla S_{i,j,l})^T p + e_i \quad (4)$$

Now, assuming that there are N>3 UTs in the footprint of satellite j, and that signal strength measurements of two beams of satellite j can be obtained from each of the N UTs (e.g., the two "best" beams, the active beam and the upcoming handover candidate), then N of the equations (4) can be combined and represented as:

$$\begin{bmatrix} (s_{1,j,k} - s_{1,j,l}) - (S_{1,j,k} - S_{1,j,l}) \\ (s_{2,j,k} - s_{2,j,l}) - (S_{2,j,k} - S_{2,j,l}) \\ \ldots \\ (s_{N,j,k} - s_{N,j,l}) - (S_{N,j,k} - S_{N,j,l}) \end{bmatrix} = \begin{bmatrix} (\nabla S_{1,j,k} - \nabla S_{1,j,l})^T \\ (\nabla S_{2,j,k} - \nabla S_{2,j,l})^T \\ \ldots \\ (\nabla S_{N,j,k} - \nabla S_{N,j,l})^T \end{bmatrix} p + \begin{bmatrix} e_1 \\ e_2 \\ \ldots \\ e_N \end{bmatrix} \quad (5)$$

Equation (5) has the form:

$$y = X\beta + \epsilon \quad (6)$$

Then, in a linear system where y is the response variable, X is the design matrix, $\beta$ is the parameter vector and $\epsilon$ is the noise term, the method of Ordinary Least Squares (OLS) can be used to find a "best fit" estimate $\hat{\beta}$ that minimizes the sum of squared residuals, where the least squares solution is:

$$\hat{\beta} = (X^T X)^{-1} X^T y \quad (7)$$

This method can be further simplified if there is advance knowledge that the attitude errors are restricted to one or two dimensions (for example, if it is known that an attitude control system affects a specific axis or axes). Using this method, the attitude errors can be estimated at any instant in time, and the estimated errors can be incorporated as corrections of the attitude angles for the "Ideal Prediction" method (or even fed back as corrections to the spacecraft attitude control system, if feasible).

Further, the above assumes that contemporaneous measurements from all the UTs are used to estimate the attitude error at a given instant. In a typical system, however, attitude errors are constantly varying, and so, according to a further example embodiment, this procedure can be repeated continually to generate updated estimates for correction of the baseline model assumptions used for "Ideal Prediction."

Position Error Estimation

Although the foregoing approach assumes that satellite position errors are negligible, according to a further example embodiment, the same technique can also be used to estimate position errors, if required, by adding position errors to increase the number of unknowns in the above equations (3) to (6).

Beam Gain Pattern Error Estimation

According to a further example embodiment, where a given beam gain pattern is known to be distorted or in error but the satellite position and attitude are known with sufficient accuracy, signal strength samples obtained from multiple UTs in the defective beam are collected over a period of time and used to develop a revised beam gain model. The approach according to this example embodiment may be according to the following method.

Collect a large number of signal strength samples of the defective beam over a period of time. These samples need to represent the full range of azimuth and elevation angles of the defective beam. With NGSO satellites, the motion of the beam over the ground provides a natural "scanning" effect that produces successive samples over a range of azimuth and elevation values from each UT in the beam. The signal strength samples used here could be obtained from different sources, such as (i) conventional measurement reports from the UT, or (ii) signal quality metrics (such as Signal Quality Indicator (SQI), or Channel Quality Indicator (CQI), etc.) typically used in link adaptation algorithms (which provides the advantage that such metrics are frequent, periodic and impose no additional signaling overhead).

For each sample, use the system link budget parameters and the known satellite and UT positions and satellite attitude to compute the estimated beam gain at that beam-relative azimuth and elevation.

From the collected data set, extract a model that can provide an estimate of the gain of the defective beam at any desired azimuth and elevation. This step could use different approaches to generate the beam gain model, depending on the type of beam and the information known about the defect that caused the error in the gain pattern. Two examples of such approaches follow.

Fitting Samples by Nonlinear Regression:

In this approach, it is assumed that that there exists a theoretical model function for the gain pattern of the defective beam as a function $F(\beta_0, \beta_1, \ldots, \beta_{m-1}, \theta, \varphi)$ of m fitting parameters $(\beta_0, \beta_1, \ldots, \beta_{m-1})$ and the antenna coordinates $(\theta, \varphi)$. Let there be n estimated beam gain samples $s_i(\theta_i, \varphi_i)$, $i \in [1 \ldots n]$ where $n > m$, collected from multiple UTs at different values of antenna coordinates $(\theta, \varphi)$. The optimal value of the parameter vector $\beta = (\beta_0, \beta_1, \ldots, \beta_{m-1})$ that minimizes the sum of squared residuals $R = \Sigma_{i=1}^n r_i^2$ where $r_i = s_i - F(\beta_0, \beta_1, \ldots, \beta_{m-1}, \theta_i, \varphi_i)$ is determined based on these assumptions.

If the function F is linear in the parameters $\beta$, then this is a linear regression problem (which can be solved as provided below). Often, however, the function F is non-linear in the parameters $\beta$, which poses a non-linear regression problem, which can be solved by a Gauss-Newton iteration, as follows:

1. The algorithm begins with an initial guess $\beta_j^1$, $j \in [0, 1, \ldots, m-1]$ for the parameters, which, for example, can be based on the ideal beam gain model.
2. In each iteration, a new estimate for the parameters is calculated—for example, in the $k^{th}$ iteration, the new estimate is $\beta_j^{k+1} = \beta_j^k + \Delta\beta_j$ for $j \in [0, 1, \ldots, m-1]$, where the superscript denotes the iteration number, and $\Delta\beta_j$ represents an incremental change in the parameters.
3. At each iteration, the function F is linearized by approximating its first-order Taylor series expansion $F^{k+1}(\beta, \theta_i, \varphi_i) = F^k(\beta, \theta_i, \varphi_i) + \Sigma_{j=0}^{m-1} J_{ij}\Delta\beta_j$, where $J_{ij}$ is the Jacobian of partial derivatives of $F^k(\beta, \theta_i, \varphi_i)$ with respect to $\beta$ at the $k^{th}$ iteration: $J_{ij} = \partial F^k(\beta, \theta_i, \varphi_i)/\partial \beta_j$.
4. The residuals at the $k^{th}$ iteration are given by:

$$r_i = s_i - F^{k+1}(\beta, \theta_i, \varphi_i) = s_i - F^k(\beta, \theta_i, \varphi_i) - \sum_{j=0}^{m-1} J_{ij}\Delta\beta_j \text{ or}$$

$$r_i = \Delta s_i - \sum_{j=0}^{m-1} J_{ij}\Delta\beta_j$$

5. The sum of the squared residuals (SSR) is:

$$\sum_{i=1}^n r_i^2 = \sum_{i=1}^n \left(\Delta s_i - \sum_{j=0}^{m-1} J_{ij}\Delta\beta_j\right)^2$$

6. The objective of the optimization is to minimize the SSR, and so the optimal solution is obtained by setting its gradient to zero—so, differentiating the SSR with respect to $\beta$ and setting it to zero results in:

$$-2\sum_{i=1}^n J_{ij}\left(\Delta s_i - \sum_{l=0}^{m-1} J_{il}\Delta\beta_l\right) = 0$$

7. This results in the m normal equations:

$$\sum_{i=1}^n \sum_{l=0}^{m-1} J_{ij}J_{il}\Delta\beta_k = \sum_{i=1}^n J_{ij}\Delta s_i \text{ for } j \in [0, 1, \ldots, m-1]$$

8. Which can be written as the matrix equation $(J^T J)\Delta\beta = J^T \Delta s$, where J is the n×m Jacobian matrix at the $k^{th}$ iteration.

9. The solution to which, at each iteration, is $\Delta\beta = (J^T J)^{-1} J^T \Delta s$.
10. Convergence is reached when the magnitude of the shift vector $\Delta\beta$ is sufficiently small from one iteration to the next.

Piecewise Surface Fitting Via Linear Regression:

In an alternate approach, it is assumed that there is no good single theoretical model function for the gain of the entire beam (e.g., because the beam defect is such that it has caused a highly irregular radiation pattern). In this case, a "divide-and-conquer" strategy is used to break down the coverage area of the beam into smaller regular sections and to compute individual, simpler fits for each section. For example, the coverage area could be divided into a square grid by azimuth and elevation, and a fit function calculated for each grid square. This approach requires a large number of well-distributed estimated beam gain samples, but each fit is a simpler multiple linear regression problem.

By way of example, the beam coverage area can be divided into K grid squares by azimuth and elevation. Then a set of fit functions $g_k(\beta_0, \beta_1, \ldots, \beta_{m-1}, \theta, \varphi)$ linear in the m parameters $(\beta_0, \beta_1, \ldots, \beta_{m-1})$, where $k \in [1, K]$, can be obtained, each of which having a corresponding domain in $(\theta, \varphi)$ covering one of the grid squares. Each function is a best fit for the estimated beam gain samples that fall within its grid square. Ideally, the functions $g_k$ would be continuous at the edges of the grid squares, but this is not a requirement. With this set of functions, the estimated beam gain for any point in the beam coverage can be estimated by using the $g_k$ for the appropriate grid square.

By way of further example, this problem can be formulated using rectangular beam coordinates (x, y) rather than polar coordinates $(\theta, \varphi)$. Let $P(\theta, \varphi)$ be a transformation that converts antenna polar coordinates to rectangular form and $P^{-1}(x, y, z)$ be the inverse transformation. For each grid square in the $(\theta, \varphi)$ grid, let there be n estimated beam gain samples $s_i(\theta_i, \varphi_i)$, $i \in [1, 2, \ldots, n]$ where $n > m$, collected from multiple UTs at different values of antenna coordinates, all falling within the grid square. Then, for each of the K grid squares, a function $f_k(\beta_0, \beta_1, \ldots, \beta_{m-1}, x, y)$, linear in the m parameters $(\beta_0, \beta_1, \ldots, \beta_{m-1})$, can be determined, which represents the best fit for the samples $s_i$ in that region. Having found $f_k(x, y)$, the desired $g_k(\theta, \varphi) = f_k(P^{-1}(x, y))$ can be obtained.

The actual number m of parameters needed depends on the choice of the fit surface. A plane and an elliptic paraboloid require only 3 parameters each, for example, Plane: $f(x, y) = (\beta_0 + \beta_1 x + \beta_2 y)$, and Elliptic paraboloid: $f(x, y) = (\beta_0 + \beta_1 x^2 + \beta_2 y^2)$, as illustrated in FIG. 5.

The least-squares solution for the above fit problem can be determined as follows:

11. The n samples $s_i(\theta_i, \varphi_i)$, $i \in [1 \ldots n]$ can be written as:

$$s_i = \sum_{j=0}^{m-1} \beta_j X_{ij} + \epsilon_i$$

where $\beta_j$ are the (unknown) fit parameters, $\epsilon_i$ is the error term and the coefficients of the fit parameters are given by $X_{i,j} = \partial f_k(\beta_0, \beta_1, \ldots, \beta_{m-1}, x_i, y_i)/\partial \beta_j$, because $f_k(\beta_0, \beta_1, \ldots, \beta_{m-1}, x, y)$ is linear in the m parameters.

1. These n equations can be written in matrix form as the equation: $s = X\beta + \epsilon$ of a linear system, where s is the (n×1) response variable, X is the (n×m) design matrix, $\beta$ is the (m×1) parameter vector and $\epsilon$ is the (n×1) noise term. The "best fit" estimate $\hat{\beta}$ that minimizes the sum of squared residuals is: $\hat{\beta}=(X^TX)^{-1}X^Ts$.

2. This yields the fit function $f_k(x, y)$, from which we then calculate the desired $g_k(\theta, \varphi)$ as $f_k(P^{-1}(x, y))$.

Pure Measurement-Based Prediction

In the "Ideal Prediction" approach, it was assumed that the satellite position, attitude and antenna gain pattern have been accurately characterized, because these are critical components of the signal strength estimation function $S_{i,j}$. If, however, it is not possible to estimate the signal strength with sufficient accuracy, then the system can apply an improved measurement-based prediction, in accordance with a further example embodiment, which is a refinement of conventional measurement-based handover decision in that it also incorporates the prediction of future handovers.

By Way of example, in a pure measurement-based prediction, it is assumed that, for a given UT, a sufficient number of signal strength measurements of the current serving beam and of each potential candidate can be obtained. By way of further example, an approach for handover prediction based on measurements may be performed according to the following method.

Start with a set of signal strength estimates $S_a(t_i)$ for the serving beam, and $S_b(t_j)$ for the candidate beam, made over a suitable period of time preceding the expected handover, where the estimates may be periodic or aperiodic, the estimates for the two beams need not be made at the same time instants, and the measurements are performed only when a potential handover is approaching.

Using standard linear regression techniques such as least-squares, estimate sets of coefficients ($\alpha_0 \ldots \alpha_n$) and ($\beta_0 \ldots \beta_n$) such that the polynomials $P_a(t)=(\alpha_0+\alpha_1 t \ldots +\alpha_n t^n)$ and $P_b(t)=(\beta_0+\beta_1 t \ldots +\beta_n t^n)$ are the best-fitting models for the given data sets $S_a(t_i)$ and $S_b(t_j)$, respectively, where n=1 provides linear models for the data sets, and n=2 provides quadratic models, and higher-order models may not be as suitable for this purpose.

Using the model polynomials $P_a$ and $P_b$ as estimates of the signal strengths of the two beams, calculate the future time $t_h$ when $P_a(t_h)=P_b(t_h)$, and $t_h$ is then the predicted handover time.

Figure 7:
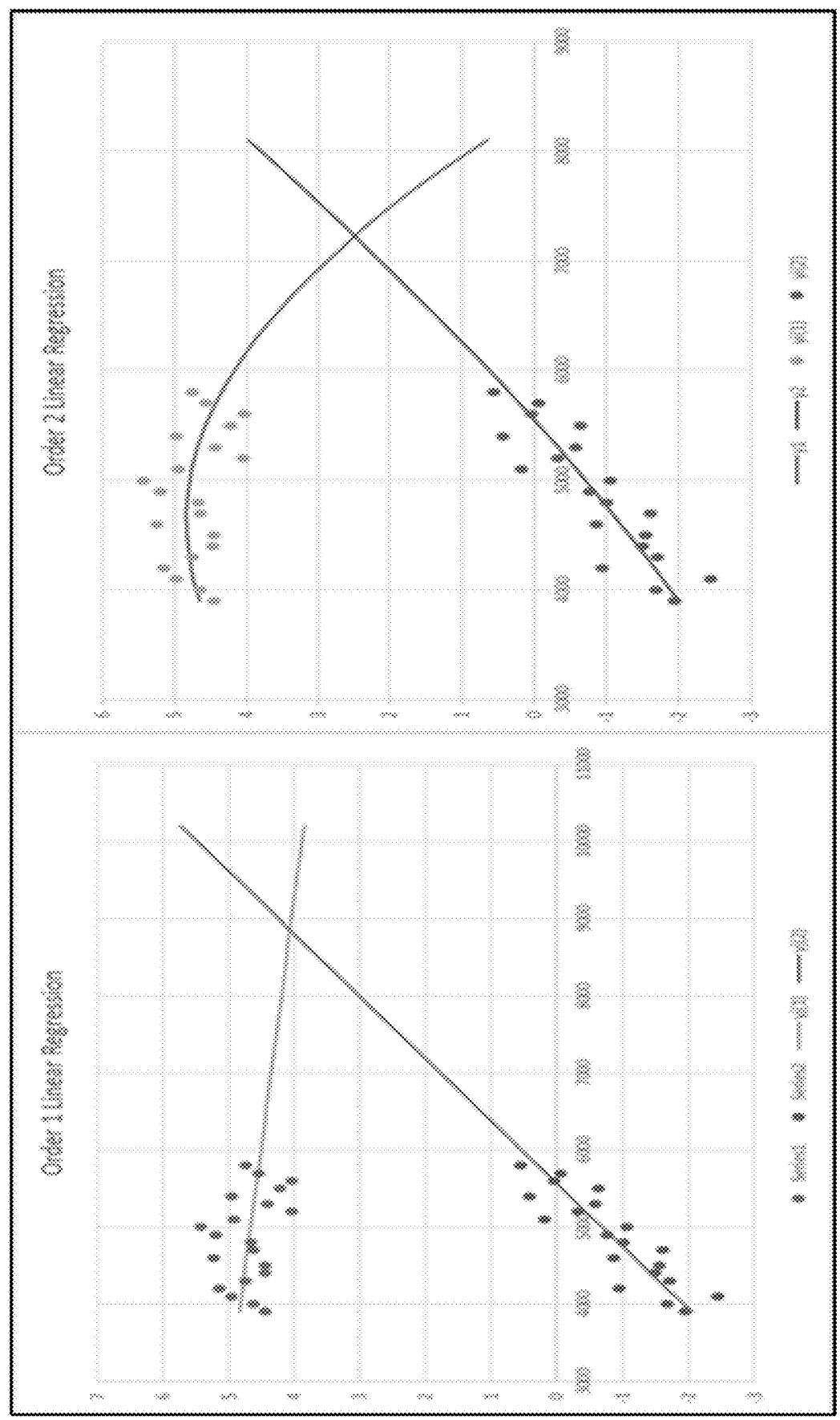
FIG. 7 illustrates an example of a measurement-based approach for handover prediction for n=1 and n=2, in accordance with example embodiments of the present invention.

FIG. 7 illustrates an example of such a measurement-based handover prediction for n=1 and n=2.

Figure 8:
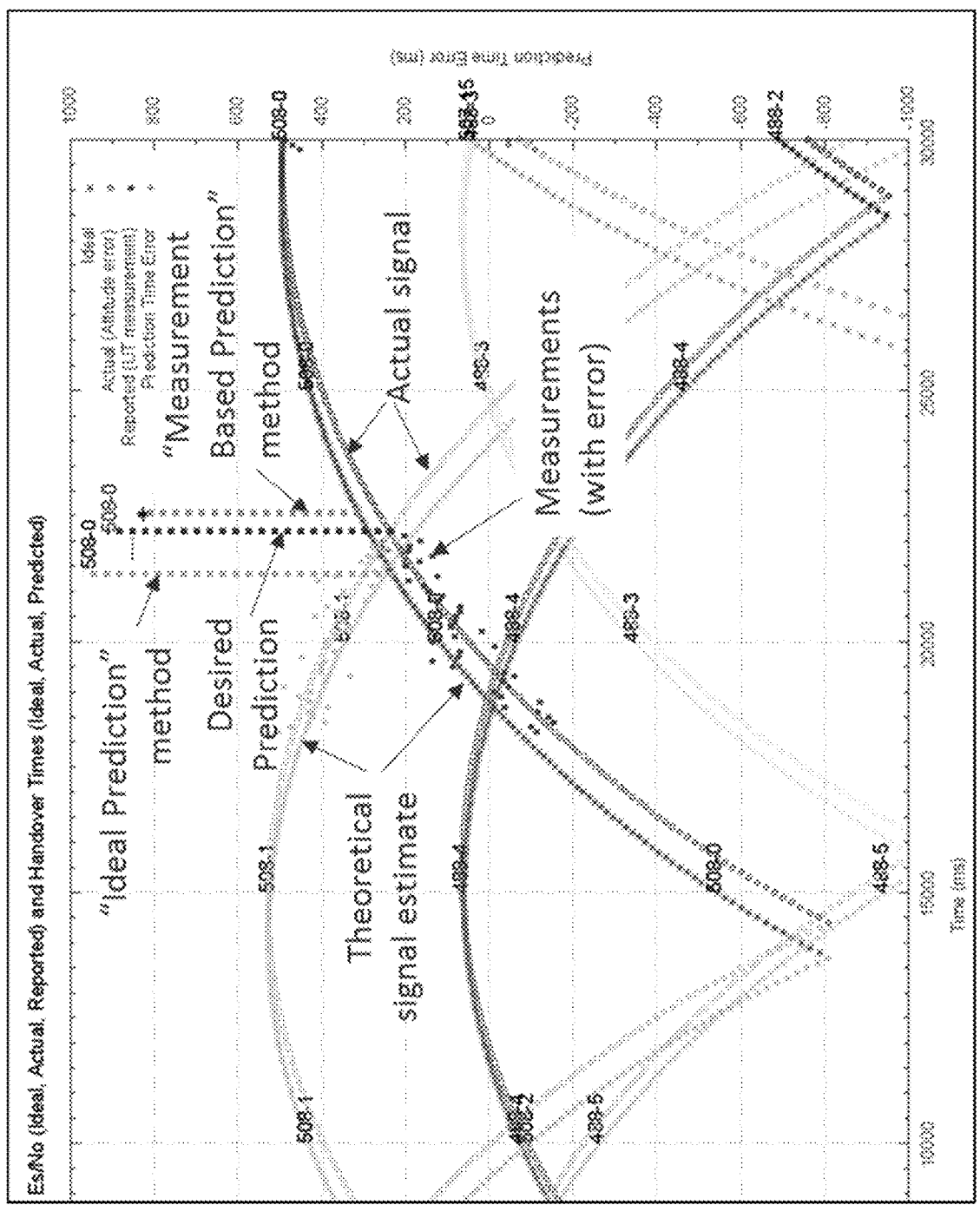
FIG. 8 illustrates an example measurement-based approach for handover prediction, in accordance with example embodiments of the present invention.

FIG. 8 illustrates an application of the measurement-based approach for handover prediction, in accordance with example embodiments. As seen in the Figure, the handover time predicted by the "measurement-based prediction" method is closer to the "desired prediction" handover point than that predicted by the "ideal prediction" method based on theoretical signal estimates.

Figure 9:
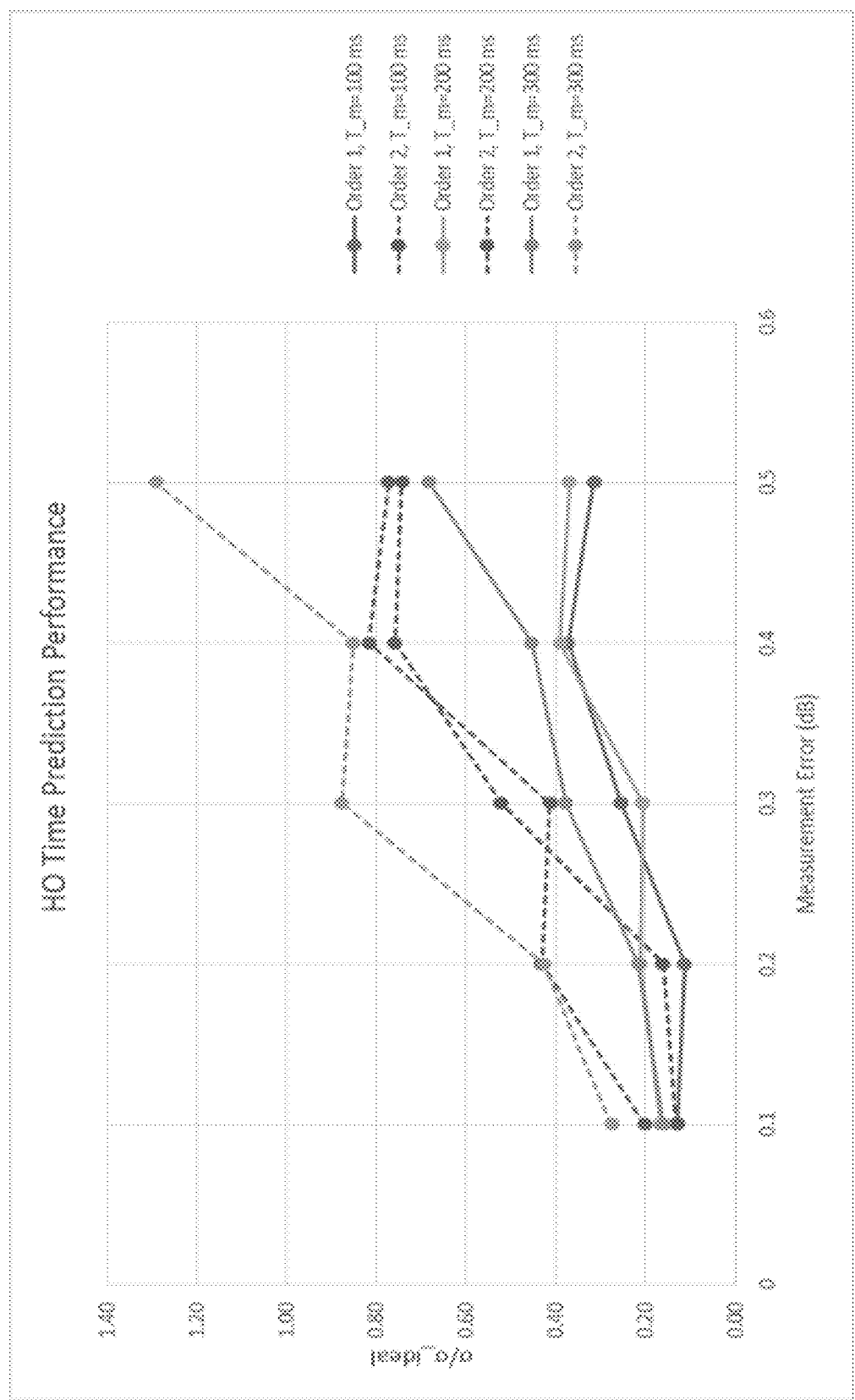
FIG. 9 illustrates a comparison of different measurement-based handover prediction performance characterizations, in accordance with example embodiments of the present invention.

FIG. 9 illustrates a comparison of different measurement-based handover prediction performance characterizations. The figure plots the metric ($\sigma/\sigma_{ideal}$), i.e., the ratio between the standard deviations of HO time prediction errors using "Measurement-Based Prediction" and using "Ideal Prediction," against measurement error for different measurement intervals and for fit polynomial orders 1 and 2.

Results may vary widely depending on the characteristics of specific NGSO systems. The FIG. 8 shows that for the specific system simulated, linear model prediction performance was better than quadratic model prediction performance, and that with periodic measurements every 300 ms and a measurement error of 0.2 dB, "Measurement-Based Prediction" was 5 times more accurate than the "Ideal Prediction" (i.e., ($\sigma/\sigma_{ideal}$)=0.2). Further, the "Measurement-Based Prediction" technique is independent of the source of the impairments, be it beam pattern deformities or satellite pointing errors, as long as they are effectively constant over the prediction period.

According to a further example embodiment, alternate regression model functions that are better at approximating the signal roll-off characteristics for a particular system may be used. For example, data based on the "Ideal Prediction" model could be used to develop such model functions.

Hybrid of Measurement-Based and Ideal Prediction

As provided above, the measurement-based prediction method described above may be employed when no reliable information is available for signal strength estimation, but this method requires a large number of reliable measurements. Alternatively, in accordance with a further example embodiment, if the beam gain pattern and attitude data are not grossly incorrect, then a hybrid approach combining measurement-based and ideal prediction may be used to reduce the number of measurements needed. Such a hybrid method may also be used when there is uncertainty in knowledge of the UT's position (e.g., because it is moving very fast). This approach, however, assumes that measurement errors are small. By way of example, an approach for handover prediction based on such a hybrid may be performed according to the following method.

Using the "ideal" signal strength prediction model function $S_{i,j}(t)$ to calculate the predicted handover time $t_{ho}$.

Also calculate average slopes of the signal strengths of the serving and candidate beams (beam a of satellite A and beam b of satellite B respectively) over a suitable time interval $[t_1, t_{ho}]$ immediately prior to $t_{ho}$, where $t_1$ is chosen to provide sufficient lead time for pre-handover processing and signaling as well as for the worst-case anticipated error in the handover prediction $t_{ho}$, which average slopes may be expressed as:

$$\dot{S}_{A,a}=(S_{A,a}(t_{ho})-S_{A,a}(t_1))/(t_{ho}-t_1)$$

$$\dot{S}_{B,b}=(S_{B,b}(t_{ho})-S_{B,b}(t_1))/(t_{ho}-t_1)$$

Let the expected difference between the signal strengths at time $t_1$ be:

$$\delta s(t_1)=(S_{A,a}(t_1)-S_{B,b}(t_1))$$

Configure the UT to send a measurement report when the candidate beam signal strength comes within $\delta s_1$ of that of the serving beam.

When the measurement report is received, let the reported difference between the signal strengths at time $t_2$ be $m_2$.

Predict the revised handover time $t'_{ho}$ as follows, using the average slopes $\dot{S}_{A,a}$ and $\dot{S}_{B,b}$ to estimate the rate at which the two beam signals will change until time $t'_{ho}$:

$$\delta s(t_2)=(S_{A,a}(t_2)-S_{B,b}(t_2))=m_2$$

$$\delta s(t'_{ho})=(S_{A,a}(t'_{ho})-S_{B,b}(t'_{ho}))=0$$

Now, assuming that for t' in the interval $[t_2, t'_{ho}]$:

$$S_{A,a}(t')\approx S_{A,a}(t_2)+(t'-t_2)\dot{S}_{A,a}$$

$$S_{B,b}(t')\approx S_{B,b}(t_2)+(t'-t_2)\dot{S}_{B,b}$$

We have:

$$\delta s(t')=(S_{A,a}(t')-S_{B,b}(t'))$$

$$\delta s(t')\approx S_{A,a}(t_2)-S_{B,b}(t_2)+(t'-t_2)(\dot{S}_{A,a}-\dot{S}_{B,b})$$

And so:

$$\delta s(t'_{ho})\approx S_{A,a}(t_2)-S_{B,b}(t_2)+(t'_{ho}-t_2)(\dot{S}_{A,a}-\dot{S}_{B,b})$$

$$0\approx m_2+(t'_{ho}-t_2)(\dot{S}_{A,a}-\dot{S}_{B,b})$$

$$t'_{ho}\approx t_2+m_2/(\dot{S}_{B,b}-\dot{S}_{A,a})$$

Figure 10:
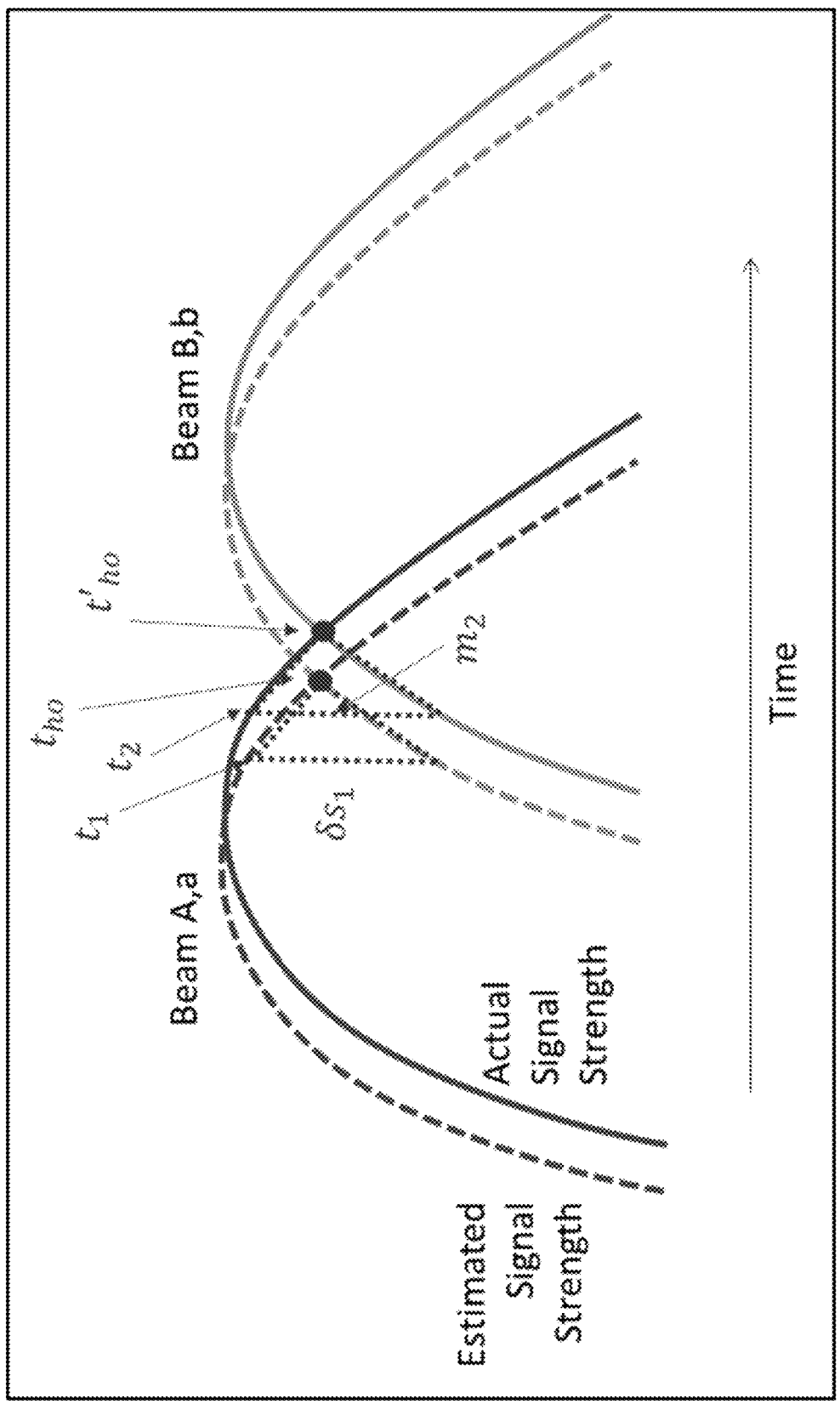
FIG. 10 illustrates an example of a hybrid approach for handover prediction, combining measurement-based and ideal prediction methods, according to example embodiments of the present invention.

FIG. 10 illustrates an example of the hybrid approach for handover prediction, combining measurement-based and ideal prediction methods, according to example embodiments.

Adaptive Techniques

A number of example handover prediction approaches for NGSO wireless communications systems have been described herein, however, such approaches may not be ideal or applicable at all times for all systems. According further example embodiments, therefore, the described approaches may be selectively combined, as appropriate at given points in time in a system, and the combination may be dynamically adjusted depending on the circumstances at different points in time. By way of example, the following hybrid and adaptive approaches may be employed based on existing system circumstances.

Assume perfect knowledge of attitude, ephemeris and beam gain patterns as a baseline, and use "Ideal Prediction" in the absence of any contraindications so as to minimize measurement overhead.

If there are small attitude errors, or significant uncertainty in the UT's position (for example, because it is moving at high speed) and the UT's measurement accuracy is expected to be good, then use the "Hybrid Measurement-Based/Ideal Prediction" method as a good compromise that imposes very little measurement overhead.

For satellites which may have large attitude errors (for example, due to ACS malfunctions), use periodic signal strength observations to continually develop an estimate of the attitude error and feed these back into the "Ideal Prediction" model.

For beams that have been noted to have defective beam patterns, perform a beam gain pattern estimation process and feed corrected beam pattern models back to the "Ideal Prediction" baseline model to improve its prediction accuracy.

Use occasional measurements to monitor the accuracy of the "Ideal Prediction" model. In case large deviations are detected, selectively switch to a measurement-based prediction strategy. At the same time, collect and save these measurements to provide input for a beam gain pattern estimation process that will generate a corrected gain pattern.

If beam gain pattern is in error or attitude errors are large and corrected estimates have not yet become available, use pure measurement-based handover prediction. This method has a higher measurement overhead than the "Hybrid" and "Ideal" prediction methods, so switch back to one of those methods when better information is available.

Figure 11:
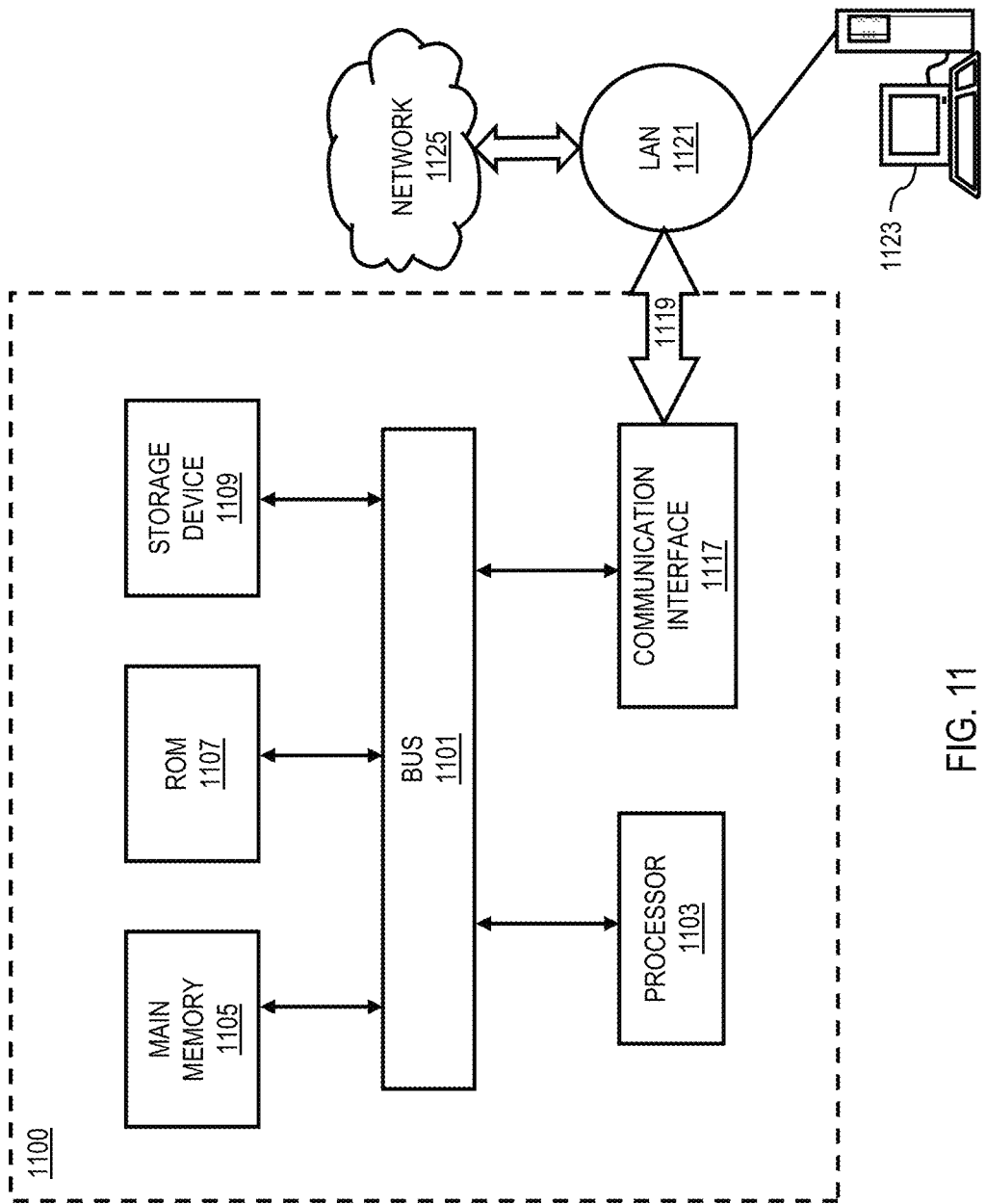
FIG. 11 illustrates a computer system, whereby one or more of which may be configured to respectively implement different aspects of example embodiments of the present invention.

FIG. 11 illustrates a computer system, whereby one or more of which may be configured to respectively implement different aspects of example embodiments of the present invention. The computer system 1100 may include a bus 1101 or other communication mechanism for communicating information, and one or more processors 1103 (of which one is shown in the Figure) coupled to the bus for processing information. The computer system may also include a memory 1105, such as a random access memory (RAM) or other dynamic storage device, coupled to the bus for storing information and instructions to be executed by the processor(s). The memory can also be used for storing temporary variables or other intermediate information during execution of instructions to be executed by the processor(s). The computer system may further include a read only memory (ROM) 1107 or other static storage device coupled to the bus for storing static information and instructions for the processor(s). The computer system may further include a storage device 1109, such as a magnetic disk or optical disk, additionally coupled to the bus for storing information and instructions.

According to one embodiment of the invention, approaches in accordance with example embodiments are provided by the computer system 1100 in response to the processor(s) executing an arrangement of instructions contained in the memory. Such instructions can be read into the memory from another computer-readable medium, such as the storage device. Execution of the arrangement of instructions causes the processor(s) to perform the process steps and/or device functions or operation described herein. One or more processors in a multi-processing arrangement may also be employed to execute the instructions. In alternative embodiments, hard-wired circuitry is used in place of or in combination with software instructions to implement such embodiments of the present invention. Thus, embodiments of the present invention are not limited to any specific combination of hardware circuitry and software.

The computer system may also include a communication interface 1117 coupled to the bus. The communication interface may provide two-way data communications, for example, coupling to a network link 1119 connected to a local network 1121. The network link may provide data communication through one or more networks to other data devices. For example, the network link may provide a connection through local network to a host computer 1123, which has connectivity to a network 1125 (e.g. a wide area network (WAN) or the Internet) or to data equipment operated by one or more service providers.

Figure 12:
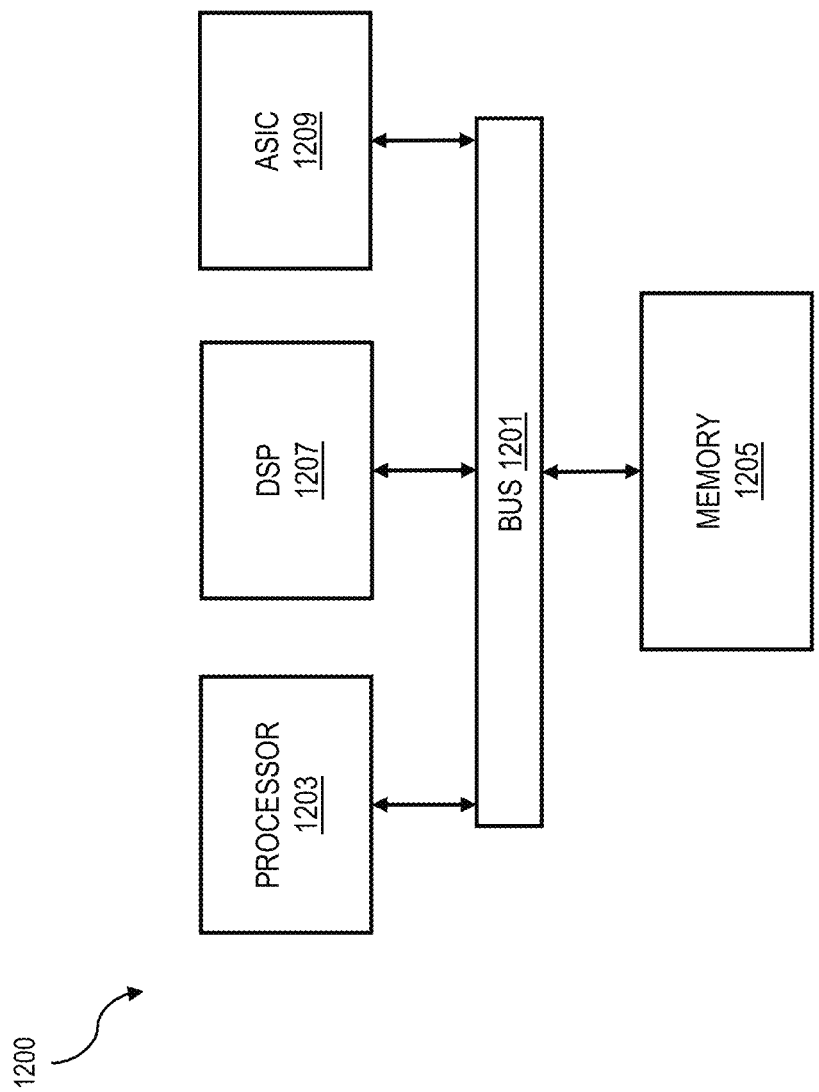
FIG. 12 illustrates a block diagram of a chip set, one or more of which may be configured to respectively implement different aspects of example embodiments of the present invention.

FIG. 12 illustrates a block diagram of a chip set, one or more of which may be configured to respectively implement different aspects of example embodiments of the present invention. The chip set 1200 includes, for instance, processor and memory components described with respect to FIG. 12 incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set 1200 includes a communication mechanism such as a bus 1201 for passing information among the components of the chip set. A processor 1203 has connectivity to the bus 1201 to execute instructions/programs and process information stored in, for example, a memory 1205. The processor may include one or more processing cores with each core configured to perform independently. A multi-core processor enables multiprocessing within a single physical package, such as two, four, eight, or greater numbers of processing cores. Alternatively or in addition, the processor may include one or more microprocessors configured in tandem via the bus to enable independent execution of instructions, pipelining, and multithreading. The processor may also be accompanied with one or more specialized components to perform certain processing functions and tasks such as one or more digital signal processors (DSP) 1207, and/or one or more application-specific integrated circuits (ASIC) 1209. A DSP typically is configured to process real-time signals (e.g., sound or video) in real time independently of the processor. Similarly, an ASIC can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor and accompanying components have connectivity to the memory via the bus. The memory may include both dynamic memory (e.g., RAM) and static memory (e.g., ROM) for storing executable instructions that, when executed by the processor and/or the DSP and/or the ASIC, perform the process of example embodiments as described herein. The memory may also store the data associated with or generated by the execution of the process.

Further, the functionality of the example embodiments of the present invention may be provided by the chip set 1200, in response to the processor executing an arrangement of program instructions contained in memory. Execution of the program instructions contained in memory causes the processor to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for prediction of user terminal handovers in a satellite data communications network that includes a plurality of satellites and a plurality of user terminals (UTs), wherein each satellite services a plurality of cells via a plurality of respective satellite beams at any given instant of time, the method comprising:

determining a time increment $\delta t$ and a number of intervals N over which the prediction is to be performed;

determining, for each of a plurality of the satellite beams j of each of one or more of the satellites i that is within the view of an antenna of the one UT, for each of a plurality of instants of time $t_n$, where $t_n = t_0 + n\delta t$, for $n \in [0, 1, \ldots, N-1]$, an estimated signal strength as seen at the one UT, wherein each estimated signal strength is determined based on a plurality of characteristics regarding each of the satellite beams j of each of the satellites i and regarding the one UT at each time $t_n$ for which the estimated signal strength is being determined, wherein the plurality of characteristics include a plurality of characteristics from the group comprising a position, pitch, roll and yaw attitudes for the satellite i, a position of the one UT, an elevation and azimuth of the one UT for the satellite beam j of the satellite i, an adjusted antenna gain of the one UT towards the satellite i, a path gain/loss from the one UT to the satellite i, and a system link budget model;

determining a next instant of time $t_m$ at which the estimated signal strength of a candidate beam of the plurality of the satellite beams j of the one or more satellites i is greater than or equal to the estimated signal strength of a one of the plurality of the satellite beams j of the one or more of the satellites i that is currently servicing the one UT; and determining to handover the one UT, at the time $t_m$, from the satellite beam that is currently servicing the one UT to the candidate beam.

2. The method according to claim 1, further comprising:

determining a handover time $t_{ho}$, where $t_{m-1} < t_{ho} \leq t_m$, at which the estimated signal strength of the satellite beam that is currently servicing the one UT is equal to the estimated signal strength of the candidate beam, by interpolating the signal strength estimates between $t_{m-1}$ and $t_m$; and determining to handover the one UT, at the time $t_{ho}$, from the satellite beam that is currently servicing the one UT to the candidate beam.

3. The method according to claim 1, wherein the plurality of characteristics regarding each of the satellite beams j of each of the satellites i and regarding the one UT at each time $t_n$ comprise:

a position $p_{s,i}$, and pitch, roll and yaw attitudes $p_i$, $r_i$, $y_i$ for each of the satellites i;

a position $p_u$ of the one UT;

an elevation $\theta_{i,j}$ and an azimuth $\varphi_{i,j}$ of the one UT for each satellite beam j for each satellite i, with respect to reference directions of an antenna of the satellite i and a beam gain $g_{s,i,j}$ for the satellite beam j;

an adjusted antenna gain $g_{u,i}$ of the one UT towards the satellite i;

a path gain/loss $g_{l,i}$, for the satellite i, from the one UT to the satellite i; and a system link budget model.

4. The method according to claim 1, wherein the determination of the estimated signal strength as seen at the one UT, for each of the plurality of the satellite beams j of each of the satellites i, comprises, for each instant of time $t_n$:

determining a position $p_{s,i}$ and pitch, roll and yaw attitudes $p_i$, $r_i$, $y_i$ for each satellite i;

determining a position $p_u$ of the one UT;

determining, based on a line of sight vector $(p_u - p_{s,i})$ from the satellite i to the one UT and based on the satellite pitch, roll and yaw attitudes $y_i$, $p_i$, $r_i$, an elevation $\theta_{i,j}$ and an azimuth $\varphi_{i,j}$ of the one UT for each satellite beam j of each satellite i, with respect to reference directions of an antenna of the satellite i, and determining a beam gain $g_{s,i,j}$ for the satellite beam j;

determining an adjusted antenna gain $g_{u,i}$ of the one UT towards the satellite i;

determining, based on a range $\|(p_{s,i} - p_u)\|$ M from the one UT to the satellite i, a path gain/loss $g_{l,i}$ for each satellite i; and determining the estimated signal strength $S_{i,j}(t_n)$ of the beam j of the satellite i as seen at the one UT at time $t_n$ based on the system link budget model and the determined gains $g_{s,i,j}$, $g_{u,i}$, $g_{l,i}$.

5. The method according to claim 1, further comprising:
detecting one or more system impairments that each respectively affects one or more of the determined optimal characteristics regarding the satellite beams j of each of the satellites i and regarding the one UT, wherein the one or more system impairments result in an inaccuracy of the determined estimated signal strengths;
determining the one or more of the plurality of characteristics that are respectively affected by each of the one or more impairments;
determining an actual or estimated error level for each of the one or more impairments for each instant of time $t_n$; and
accounting for the determined error level for each of the one or more impairments, for each instant of time $t_n$, as an adjustment in the respective characteristic for the determination of the estimated signal strength at the respective instant of time $t_n$.

6. The method according to claim 5, wherein:
the one or more system impairments include variation in satellite attitude and variation in antenna gain patterns relative to the respective determined characteristics for a respective one or more of the satellites i, and error in position of the one UT relative to the respective determined characteristics for the one UT.

7. The method according to claim 5, wherein:
the detection of the one or more system impairments is based on one or more of a handover of each of one or more of the UTs to an incorrect satellite beam, a handover of one or more of each of the UTs at an incorrect handover time, and an determination of an inaccurate estimated signal strength for respective estimated signal strength determinations for one or more of the UTs.

8. The method according to claim 1, further comprising:
determining existence of a variation of satellite attitude relative to the respective determined characteristics for a one satellite x of the satellites i;
measuring, by each of a plurality of the UTs within a footprint of the satellite x, a signal strength of a satellite beam k of the satellite x that is currently servicing the one UT and a signal strength of a neighboring candidate satellite beam l of the satellite x at a time t;
determining an error level for the variation of the satellite attitude based on the satellite beam signal strengths for the satellite beams k and l of the satellite x measured by each of the plurality of UTs within the footprint of the satellite x; and
accounting for the determined error level for the variation of the satellite attitude, for the instant of time $t_n$=t, as an adjustment in the respective characteristic for the determination of the estimated signal strength at the respective instant of time $t_n$.

9. The method according to claim 1, further comprising:
determining existence of a variation of an antenna beam gain pattern relative to the respective determined optimal characteristics for a beam k of a one of the satellites x;
measuring, by each of a plurality of the UTs within a footprint of the satellite x, a plurality of signal strength samples for a range of azimuth and elevation angles of the beam k over a period of time;
determining an error level for the variation of the antenna beam gain pattern by determining, for each signal strength sample, an estimated beam gain at the respective azimuth and elevation, and determining a beam gain model that can provide an estimate of the gain of the beam k at any desired azimuth and elevation; and
accounting for the determined error level for the variation of the antenna beam gain pattern as an adjustment in the respective characteristic for the determination of the estimated signal strength.

10. A device for prediction of user terminal handovers in a satellite data communications network that includes a plurality of satellites and a plurality of user terminals (UTs), wherein each satellite services a plurality of cells via a plurality of respective satellite beams at any given instant of time, wherein the device comprises:
one or more processors, wherein the one or more processors are configured to:
determine a time increment $\delta t$ and a number of intervals N over which the prediction is to be performed;
determine, for each of a plurality of the satellite beams j of each of one or more of the satellites i that is within the view of an antenna of the one UT, for each of a plurality of instants of time $t_n$, where $t_n = t_0 + n\delta t$, for $n \in [0,1, \ldots, N-1]$, an estimated signal strength as seen at the one UT, wherein each estimated signal strength is determined based on a plurality of characteristics regarding each of the satellite beams j of each of the satellites i and regarding the one UT at each time $t_n$ for which the estimated signal strength is being determined, wherein the plurality of characteristics include a plurality of characteristics from the group comprising a position, pitch, roll and yaw attitudes for the satellite i, a position of the one UT, an elevation and azimuth of the one UT for the satellite beam j of the satellite i, an adjusted antenna gain of the one UT towards the satellite i, a path gain/loss from the one UT to the satellite i, and a system link budget model;
determine a next instant of time $t_m$ at which the estimated signal strength of a candidate beam of the plurality of the satellite beams j of the one or more satellites i is greater than or equal to the estimated signal strength of a one of the plurality of the satellite beams j of the one or more of the satellites i that is currently servicing the one UT; and
determine to handover the one UT, at the time $t_m$, from the satellite beam that is currently servicing the one UT to the candidate beam.

11. The device according to claim 10, wherein the one or more processors are further configured to:
determine a handover time $t_{ho}$, where $t_{m-1} < t_{ho} \leq t_m$, at which the estimated signal strength of the satellite beam that is currently servicing the one UT is equal to the estimated signal strength of the candidate beam, by interpolating the signal strength estimates between $t_{m-1}$ and $t_m$; and
determine to handover the one UT, at the time $t_{ho}$, from the satellite beam that is currently servicing the one UT to the candidate beam.

12. The device according to claim 10, wherein the plurality of characteristics regarding each of the satellite beams j of each of the satellites i and regarding the one UT at each time $t_n$ comprise:
a position $p_{s,i}$ and pitch, roll and yaw attitudes $p_i$, $r_i$, $y_i$ for each of the satellites i;
a position $p_u$ of the one UT;
an elevation $\theta_{i,j}$ and an azimuth $\varphi_{i,j}$ of the one UT for each satellite beam j for each satellite i, with respect to reference directions of an antenna of the satellite i and a beam gain $g_{s,i,j}$ for the satellite beam j;

an adjusted antenna gain $g_{u,i}$ of the one UT towards the satellite i;

a path gain/loss $g_{l,i}$, for the satellite i, from the one UT to the satellite i; and a system link budget model.

13. The device according to claim 10, wherein the determination of the estimated signal strength as seen at the one UT, for each of the plurality of the satellite beams j of each of the satellites i, comprises, for each instant of time $t_n$:

determining a position $p_{s,i}$ and pitch, roll and yaw attitudes $p_i$, $r_i$, $y_i$ for each satellite i;

determining a position $p_u$ of the one UT;

determining, based on a line of sight vector $(p_u - p_{s,i})$ from the satellite i to the one UT and based on the satellite pitch, roll and yaw attitudes $y_i$, $p_i$, $r_i$, an elevation $\theta_{i,j}$ and an azimuth $\varphi_{i,j}$ of the one UT for each satellite beam j of each satellite i, with respect to reference directions of an antenna of the satellite i, and determining a beam gain $g_{s,i,j}$ for the satellite beam j;

determining an adjusted antenna gain $g_{u,i}$ of the one UT towards the satellite i;

determining, based on a range $\|(p_{s,i} - p_u)\|$ from the one UT to the satellite i, a path gain/loss $g_{l,i}$ for each satellite i; and determining the estimated signal strength $S_{i,j}(t_n)$ of the beam j of the satellite i as seen at the one UT at time $t_n$ based on the system link budget model and the determined gains $g_{s,i,j}$, $g_{u,i}$, $g_{l,i}$.

14. The device according to claim 10, wherein the one or more processors are further configured to:

detect one or more system impairments that each respectively affects one or more of the determined optimal characteristics regarding the satellite beams j of each of the satellites i and regarding the one UT, wherein the one or more system impairments result in an inaccuracy of the determined estimated signal strengths;

determine the one or more of the plurality of characteristics that are respectively affected by each of the one or more impairments;

determine an actual or estimated error level for each of the one or more impairments for each instant of time $t_n$; and account for the determined error level for each of the one or more impairments, for each instant of time $t_n$, as an adjustment in the respective optimal characteristic for the determination of the estimated signal strength at the respective instant of time $t_n$.

15. The device according to claim 14, wherein:

the one or more system impairments include variation in satellite attitude and variation in antenna gain patterns relative to the respective determined characteristics for a respective one or more of the satellites i, and error in position of the one UT relative to the respective determined characteristics for the one UT.

16. The device according to claim 14, wherein:

the detection of the one or more system impairments is based on one or more of a handover of each of one or more of the UTs to an incorrect satellite beam, a handover of one or more of each of the UTs at an incorrect handover time, and an determination of an inaccurate estimated signal strength for respective estimated signal strength determinations for one or more of the UTs.

17. The device according to claim 10, wherein the one or more processors are further configured to:

determine existence of a variation of satellite attitude relative to the respective determined characteristics for a one satellite x of the satellites i;

measure, by each of a plurality of the UTs within a footprint of the satellite x, a signal strength of a satellite beam k of the satellite x that is currently servicing the one UT and a signal strength of a neighboring candidate satellite beam l of the satellite x at a time t;

determine an error level for the variation of the satellite attitude based on the satellite beam signal strengths for the satellite beams k and l of the satellite x measured by each of the plurality of UTs within the footprint of the satellite x; and account for the determined error level for the variation of the satellite attitude, for the instant of time $t_n = t$, as an adjustment in the respective optimal characteristic for the determination of the estimated signal strength at the respective instant of time $t_n$.

18. The device according to claim 10, wherein the one or more processors are further configured to:

determine existence of a variation of an antenna beam gain pattern relative to the respective determined optimal characteristics for a beam k of a one of the satellites x;

measure, by each of a plurality of the UTs within a footprint of the satellite x, a plurality of signal strength samples for a range of azimuth and elevation angles of the beam k over a period of time;

determine an error level for the variation of the antenna beam gain pattern by determining, for each signal strength sample, an estimated beam gain at the respective azimuth and elevation, and determine a beam gain model that can provide an estimate of the gain of the beam k at any desired azimuth and elevation; and account for the determined error level for the variation of the antenna beam gain pattern as an adjustment in the respective characteristic for the determination of the estimated signal strength.

* * * * *

UNITED STATES PATENT AND TRADEMARK OFFICE
CERTIFICATE OF CORRECTION

PATENT NO.       : 11,032,751 B2
APPLICATION NO.  : 16/253081
DATED            : June 8, 2021
INVENTOR(S)      : Deepak Arur et al.

Page 1 of 1

It is certified that error appears in the above-identified patent and that said Letters Patent is hereby corrected as shown below:

In Claim 17, (Column 28, Line 28), the term "optimal" should be deleted.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*